(12) United States Patent
Blanc et al.

(10) Patent No.: US 7,350,456 B2
(45) Date of Patent: *Apr. 1, 2008

(54) DEVICE FOR PRODUCING BEVERAGE BY INFUSION

(75) Inventors: Jean-Pierre Blanc, Nice (FR); Christian Ferrier, Nice (FR)

(73) Assignee: Compagine Mediterraneenne des Cafes S.A., Carros (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/506,213

(22) PCT Filed: Feb. 26, 2003

(86) PCT No.: PCT/FR03/00612

§ 371 (c)(1), (2), (4) Date: Jun. 17, 2005

(87) PCT Pub. No.: WO03/073897

PCT Pub. Date: Sep. 12, 2003

(65) Prior Publication Data

US 2005/0235834 A1 Oct. 27, 2005

(30) Foreign Application Priority Data

| Mar. 1, 2002 | (FR) | 02 02733 |
| Jun. 3, 2002 | (FR) | 02 06765 |
| Oct. 4, 2002 | (FR) | 02 12295 |

(51) Int. Cl.
*A47J 31/40* (2006.01)

(52) U.S. Cl. ...................... 99/302 P; 99/295

(58) Field of Classification Search .......... 99/288–303, 99/295; 426/433

See application file for complete search history.

(56) References Cited

U.S. PATENT DOCUMENTS

| 2,952,202 A | * | 9/1960 | Renner et al. | 99/289 R |
| 3,143,955 A | * | 8/1964 | Rockwell | 99/289 R |
| 3,181,734 A | * | 5/1965 | Ensign | 222/83.5 |
| 3,213,777 A | * | 10/1965 | Heier | 99/289 R |
| 3,269,298 A | * | 8/1966 | Grundmann | 99/289 R |
| 3,356,011 A | * | 12/1967 | Parraga | 99/289 R |
| 4,253,385 A | * | 3/1981 | Illy | 99/281 |
| 4,429,623 A | * | 2/1984 | Illy | 99/295 |
| 5,454,293 A | * | 10/1995 | Santi | 99/289 R |
| 5,520,093 A | | 5/1996 | Ackermann | |
| 5,755,149 A | * | 5/1998 | Blanc et al. | 99/289 T |

FOREIGN PATENT DOCUMENTS

| EP | 1 153 561 | 11/2001 |
| EP | 1 219 217 | 7/2002 |
| FR | 2 713 905 | 6/1995 |

* cited by examiner

*Primary Examiner*—Timothy F. Simone
(74) *Attorney, Agent, or Firm*—Young & Thompson

(57) ABSTRACT

A device for the production of beverages such as coffee by infusion of a product contained in a tablet (2) includes an infusion chamber (1) adapted to receive a tablet (2) having two portions (3, 4) shaped to move toward or away from each other to close or open the infusion chamber (1), in which device only one of the portions has mobility and rotation so as to place the tablet (2) in abutment in the portion and that the portion (3) movable in rotation has mobility in translation to open or close the infusion chamber (1). The device includes additional elements for holding closed the two portions of the infusion chamber (1).

5 Claims, 20 Drawing Sheets

A-A

A-A

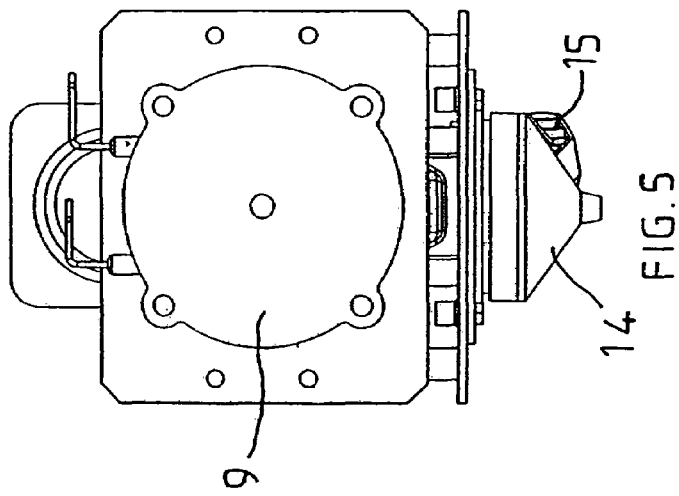
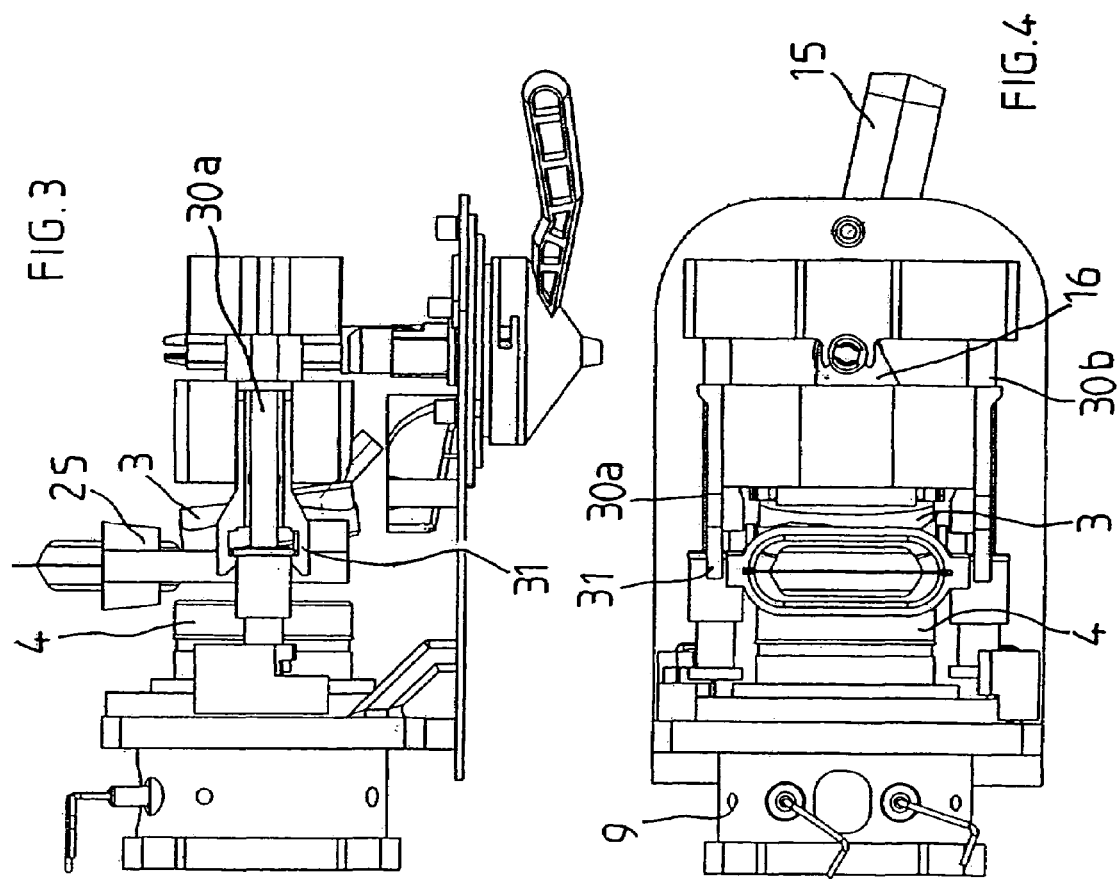

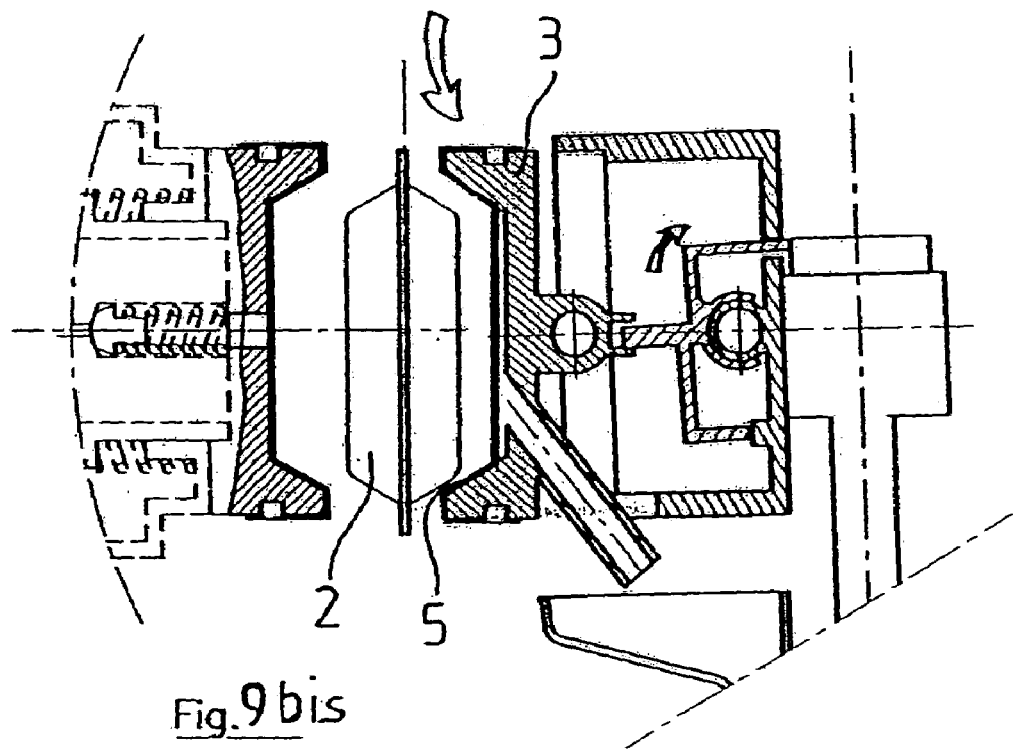
Fig. 9 bis
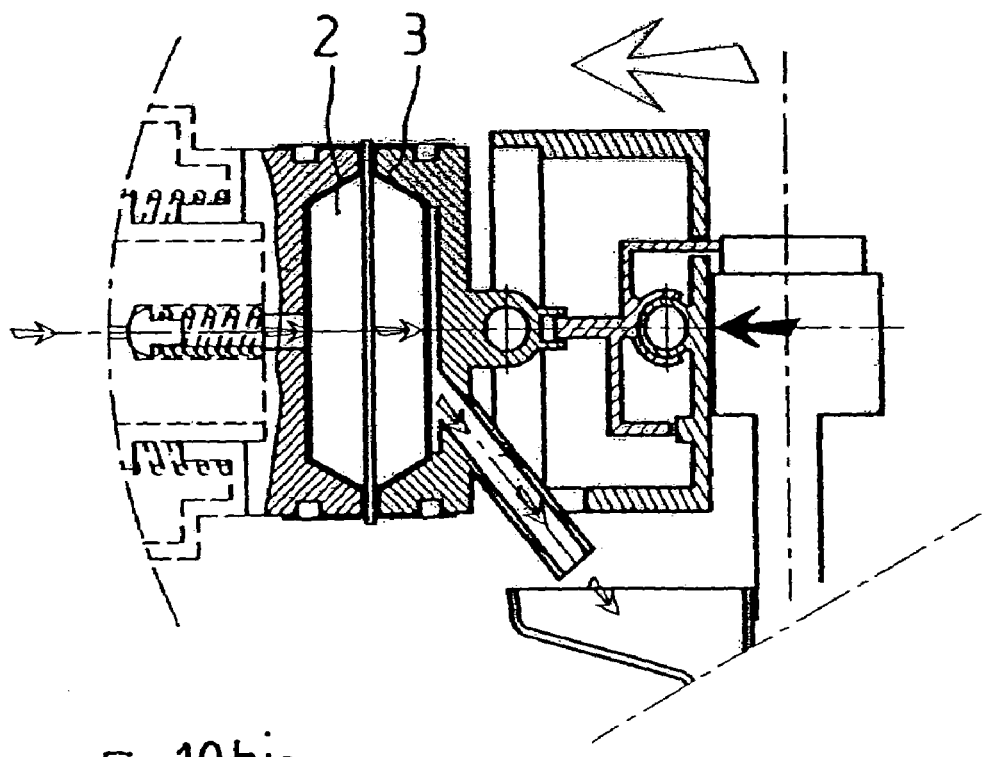
Fig. 10 bis

DEVICE FOR PRODUCING BEVERAGE BY INFUSION

BACKGROUND OF THE INVENTION

The present invention relates to a device for production of beverages by infusion from a product contained in a tablet.

It finds particular use in the field of the production of coffee from ground coffee prepackaged in tablets.

Such tablets are already known and are generally constituted in the form of an assembly of two sheets of filter paper providing an intermediate space for packaging ground coffee.

Various machines for extracting hot beverages from ground coffee are known.

Particularly, WO 00/38558 discloses an extraction chamber for an automatic machine for the preparation of hot beverages, in which the extraction chamber is provided to receive tablets or pellets filled with ground coffee.

The chamber is constituted in two parts, each movable in a horizontal plane so as to be able to move apart or toward one another.

Moreover, according to this document, the two portions are also movable in an oscillating manner.

A machine thus provided gives general satisfaction but requires driving the two constituent portions of the chamber.

It is thus necessary to provide a sufficiently powerful motor and a system of power transmission that is relatively complicated, requiring the synchronization of the movements.

There is also known from FR 2.745.995, an apparatus for the production of beverages in which the infusion chamber is constituted by two half recesses, one carried by one surface of the body of the apparatus, the other fixed on a surface of the heater, these two surfaces facing each other.

The infusion chamber is formed when the two half recesses meet.

Disassembly of the chamber takes place by a translatory movement of one of the recesses.

The apparatus thus constituted requires the association of different abutment means ensuring the retention of the tablet at the time of supply, then during its entry into the infusion chamber.

A movement of the abutment means is also necessary to ensure the ejection of the used tablets.

The prior art disclosed by this reference requires the separate provision of abutment means and ejection means for the tablets.

There is known from U.S. Pat. No. 5,520,093 a coffee machine for tablets in a strip in which the infusion chamber comprises a portion movable in rotation and translation by means of a member forming a cam. In addition to the fairly complicated nature of the emplacement and injection of the tablets, this document has a complicated and cumbersome actuation necessarily requiring the provision of the sealing of the chamber by means of the cam system.

EP 1 153 561 discloses a coffee machine for a capsule having a movable cap to open or close the infusion chamber. A complicated system is also provided to apply the capsule in a gripped fashion.

Given the present actuation of infusion chambers, the means for moving the portions of the chamber must be designed to be heavy and complicated, in particular to ensure the sealing in the closed position. It is thus necessary to take into account the fact that a machine of the espresso type produces hot water at a pressure often of the order of 15 bars.

SUMMARY OF THE INVENTION

The present invention permits overcoming these drawbacks.

For this purpose, it provides a device for the improved production of beverages.

A first advantage of the invention is permitting the carrying out of the opening and closing phases of the infusion chamber as well as the performance of the introduction and injection phases of tablets, by means of a smaller number of movements and in particular by the combined movement of rotation and translation of only one of the constituent parts of the chamber.

Another advantage of the invention is not requiring, in a preferred embodiment, but a single drive means for the movement of rotation and movement of translation, thereby ensuring synchronization reliably and at least cost.

According to a preferred modification, the invention is such that it can be used and actuated by a user by pulling a lever.

The use of the device provided here can thus be compared to that of a conventional machine having a filter door with a handle, thus providing the extraction phases of the beverage in an automatic manner.

An additional gripping means functions as a supplement to ensure or to perfect the sealing of the chamber in the lixiviation position.

Other objects and advantages will become apparent from the description which follows, of a preferred embodiment of the invention, which is however not limiting.

The present invention relates to a device for the production of beverages by infusion from a product contained in a tablet, comprising an infusion chamber adapted to receive a tablet and comprising two portions arranged to move toward or away from each other to close or open the infusion chamber, the device being such that a single one of the portions has mobility in rotation adapted to place the tablet in abutment in said portion and that the portion movable in rotation has mobility in translation to open or close the infusion chamber, characterized by the fact that it comprises additional means for holding closed the two portions of the infusion chamber.

According to preferred modifications, the device is such that:

the additional closure means are means for moving in translation the portion fixed in rotation, the movement means are constituted by a jack, the jack is hydraulic and supplied by the heater supplying the infusion chamber, the jack chamber is formed between a surface of the heater and a movable member secured to the portion fixed in rotation of the infusion chamber, the surface comprising a supply outlet for hot water, it comprises a resilient membrane for sealing between said surface and said movable member to close in a sealed fashion the jack chamber, the movable member comprises a supply passage of the infusion chamber formed between the jack chamber and a spray present on the portion fixed in rotation, the supply passage has a valve arranged to open the supply passage from a pressure greater than the working pressure of the jack, it comprises a return spring for the movable member of the jack, it comprises a common drive member for mobility in rotation and mobility in translation of the movable portion, the drive means is a cam having:
a first external bearing surface for a translatory member coupled to the movable portion;
a second external bearing surface for an end of a pivoting arm coupled to the movable portion;
the cam is actuated in rotation by a lever,
the common drive means comprises a rotatable drive shaft coupled to the movable portion by at least one rod pivotally mounted between said drive shaft and said movable portion,
it comprises a translatory member secured to the movable portion in its movement of translation and relative to which it is movable in rotation,
it has guide means in translation for the translatory member,
the shaft is actuated in rotation by a lever,
it comprises guide means for the tablet,
the guide means comprise a slide way with at least one groove adapted to receive the periphery of a tablet,
the guide means are mounted in translation to follow the movement of the parts moving toward or away from each other,
the movement of the movable portion is configured to face the fixed portion in a parallel manner before coming into contact, during the phase of closing the infusion chamber.

BRIEF DESCRIPTION OF THE DRAWINGS

The accompanying drawings are given by way of example and are not limiting of the invention. They show only an embodiment of the invention and will permit easy comprehension of it.

FIG. 3 is a side view of the device according to the invention.

FIGS. 4 and 5 are respectively top plan and front views.

FIGS. 9 to 12 and 9bis, 10bis show four successive steps in the operation of the device.

DESCRIPTION OF THE PREFERRED EMBODIMENTS

Figure 1:
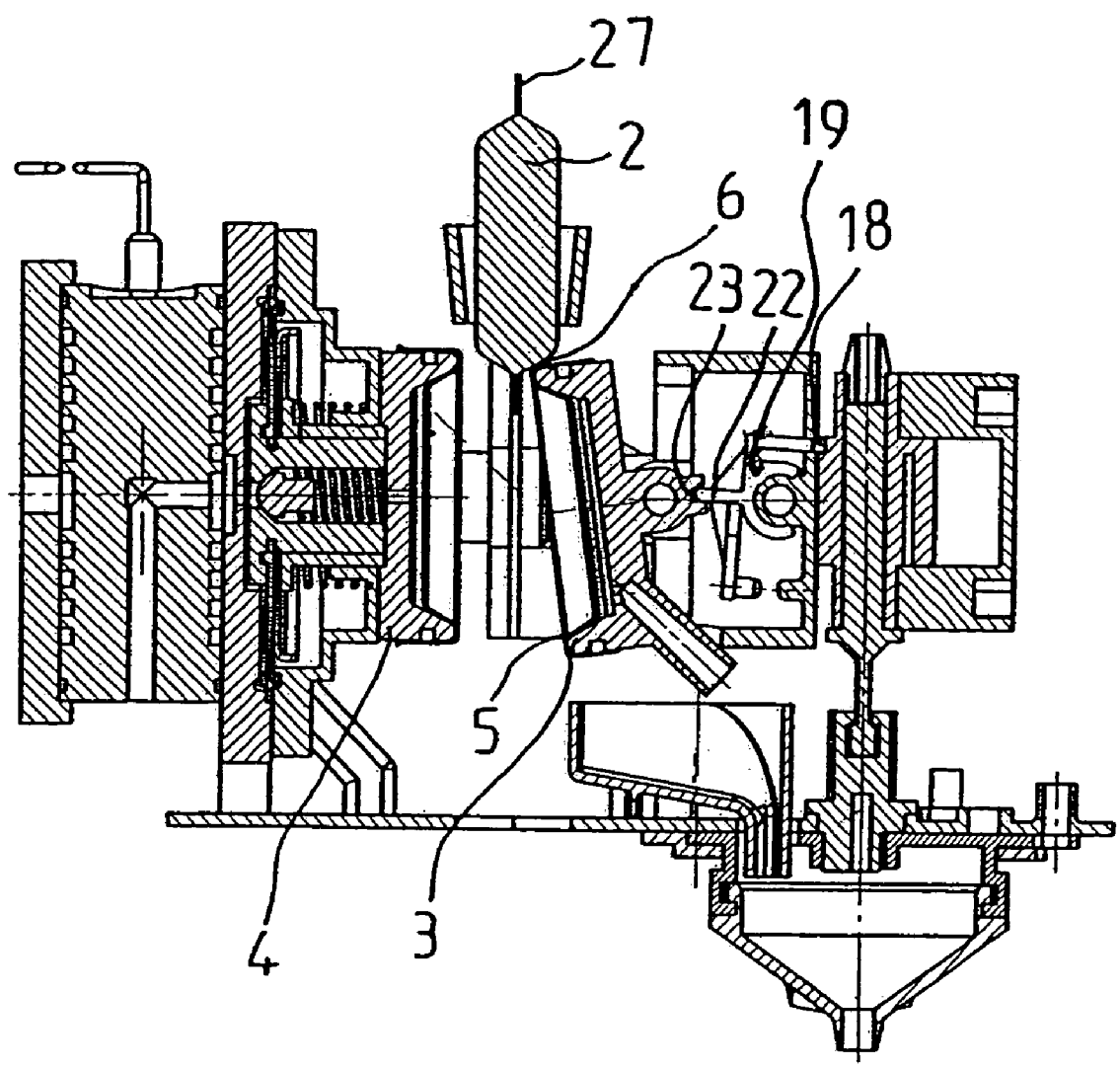
FIG. 1 is a cross-sectional view of the device according to a first embodiment of the invention.

Referring to the drawings, the device according to the invention has in a conventional manner a heater 9 adapted to supply the infusion chamber 1 with hot water for the extraction of the material contained in the tablet and particularly of the ground coffee.

Figure 2:
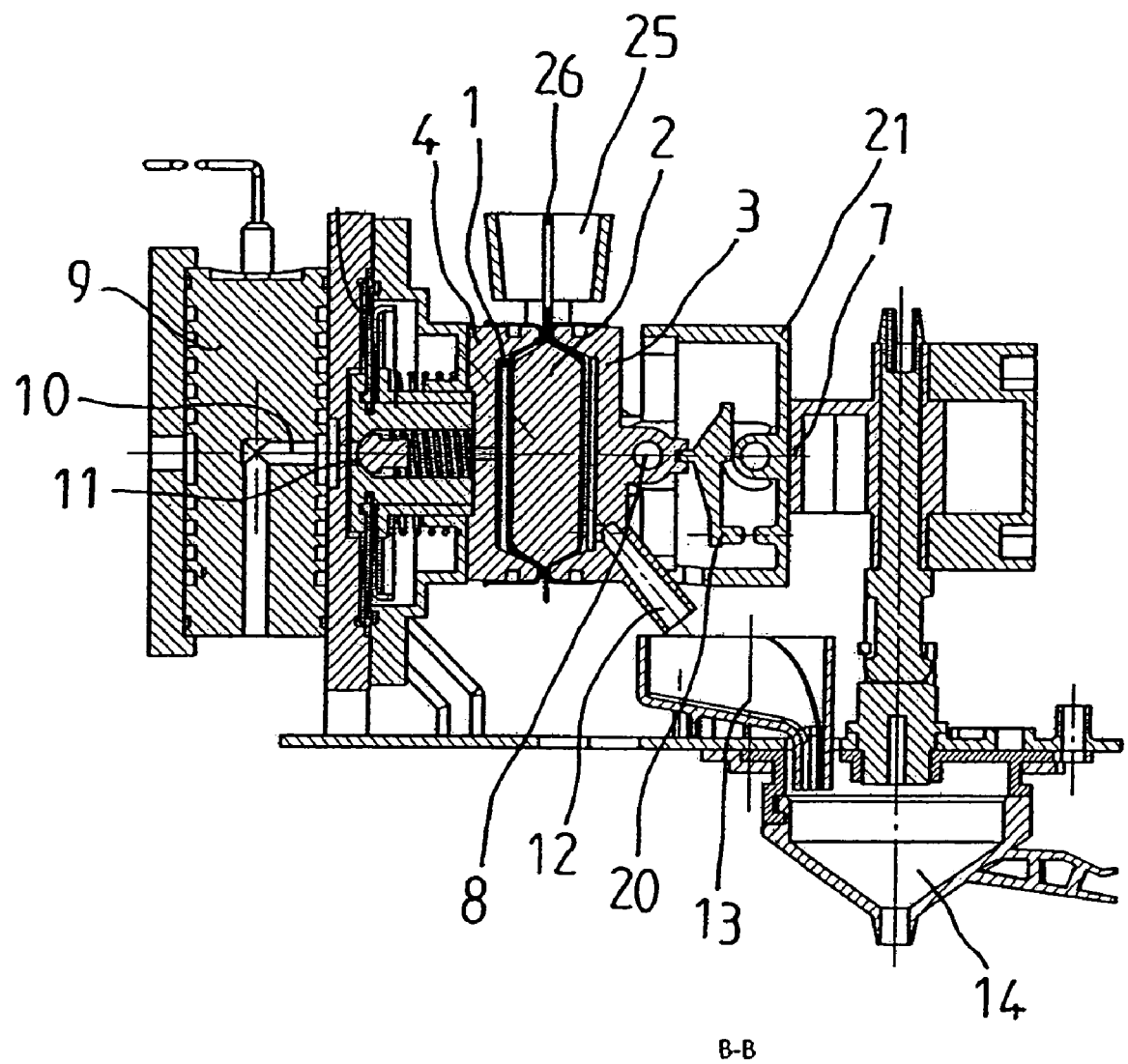
FIG. 2 is another cross-sectional view of a different configuration of the infusion chamber.

As shown in FIG. 2, a water circuit 10 is present through the device with a portion 11 for admission of hot water into the infusion chamber 1 and an outlet portion 12 opening into a trough 13 pouring the beverage into a funnel 14 to the receptacle of the user.

As shown in FIGS. 1-14, the end portions of this circuit can be constituted in the external form of a conventional filter door comprising a handle here shown by the lever 15 and a portion forming a funnel 14.

The tablets used for the operation of the present invention could be of a type now available on the market.

Preferably, but in a non-limiting way, there could be used tablets 2 comprising a substantially flat and rigid periphery ensuring holding the shape of the tablet.

The infusion chamber 1 is constituted by two portions 3, 4 adapted to be brought together to close the chamber 1 as is seen in FIG. 2 or moved apart to open it as seen in FIG. 1.

Preferably, and in the rest of the description, it is the portion 3 which moves in translation to move toward or away from the other portion 4.

Moreover, the portion 3 is given a rotative movement over a limited path, to pass between various positions during operation.

In a preferred manner, there is used a same drive means to ensure the translation and the rotation of the movable portion 3.

There will be described hereafter successively two modified embodiments of this drive means.

First Embodiment

See FIGS. 1 to 14.

There is shown by way of example in FIG. 2, the position of the axis 8 of rotation of the movable portion 3 and the axis 7 of its translation.

For what follows in the description and with reference to the drawings, there will be shown a horizontal extraction means (in which the tablet is positioned substantially vertically and receives hot water in a substantially horizontal circuit).

However, other orientations are possible without departing from the scope of the invention.

The single drive means could be constituted by a cam 16 actuated in rotation and having an external surface comprising two portions.

A first portion of the external surface 17 of the cam 16 ensures the bearing of the cam against a translatory member adapted to transmit the movement of translation of the movable portion 3.

The second external surface of the cam 16, shown at 18, in FIG. 1, ensures the bearing of one end of the pivoting arm 19 whose pivotal movement is transmitted to the movable portion 3 to carry out its rotation.

The coupling between the pivoting arm 19 and the movable portion 3 could be carried out by means of a finger 18 inserted in a fork 23 of the movable part, as shown in FIG. 1.

The pivotal axis of the pivoting arm 19 is provided by a coupling member 21 also shown in FIG. 1 and indicated in FIG. 2.

It is this coupling member which drives in rotation the movable member 3 by bearing on the cam 16.

Other means for transmission of movements of rotation and translation to the movable portion 3 may also be envisaged.

Preferably, the pivoting arm 19 comprises an extension forming a path limiter 20 and adapted to come into abutment with an abutment surface when a predetermined angular position of the movable portion 3 is reached.

Such is the case in the upwardly open bearing position of the infusion chamber 1.

According to a first possibility, the cam 16 is driven in rotation by a motor.

According to a second possibility, shown in the drawings, the driving in rotation of the cam 16 is carried out by the pressure of a lever 15 which can be actuated by the user.

Figure 6:
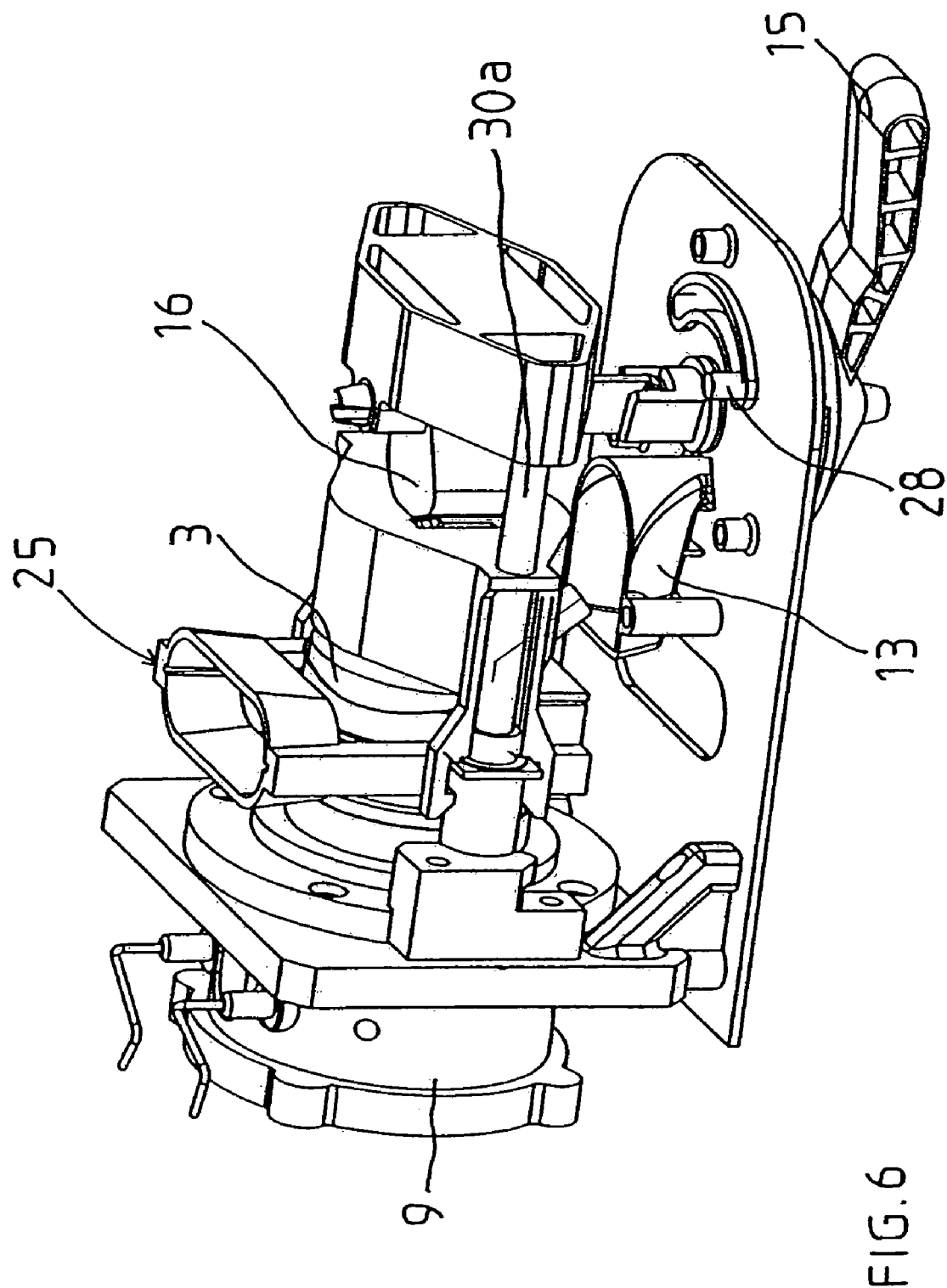
FIG. 6 is a perspective view of the device during a phase of extraction of coffee.
Figure 7:
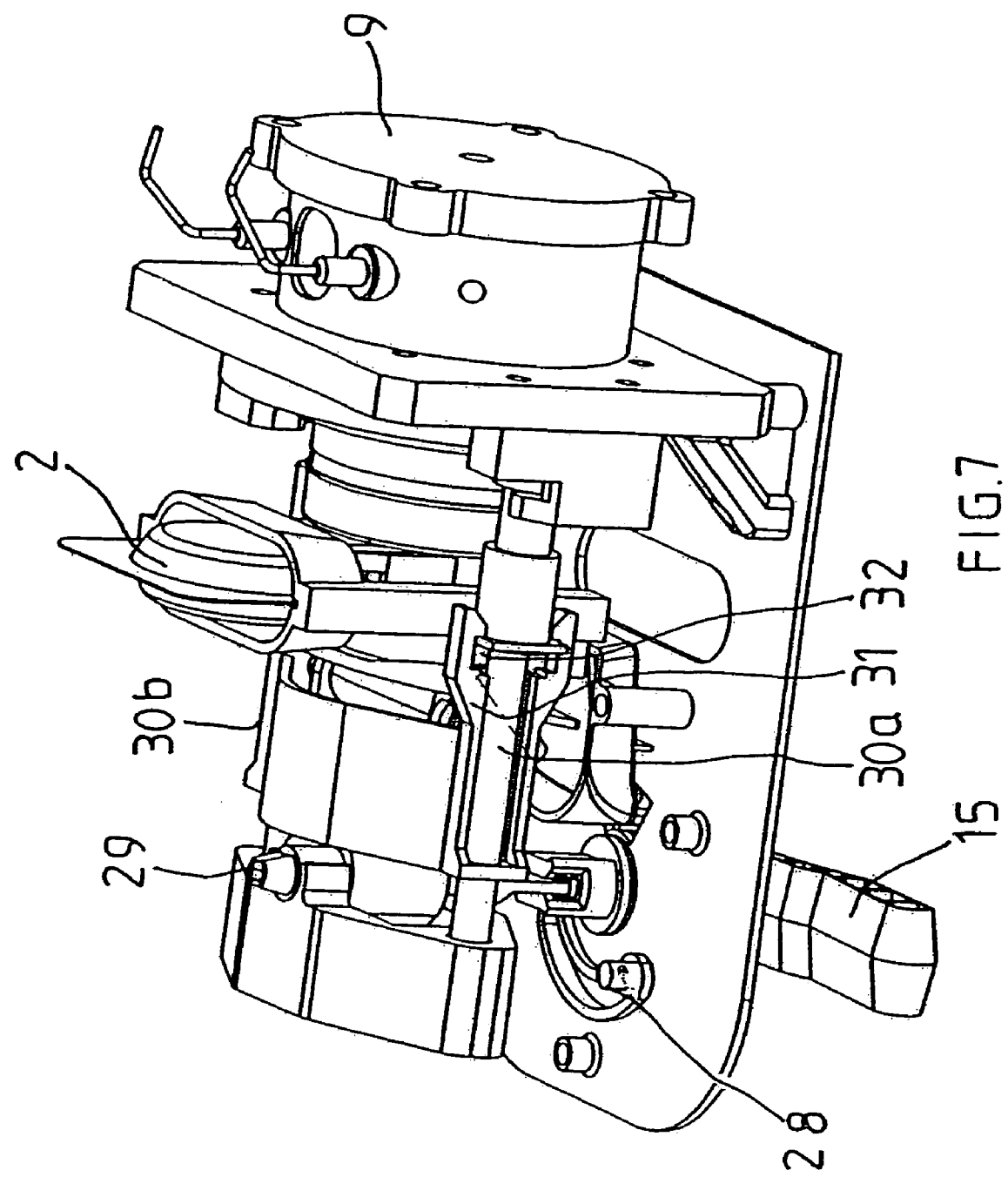
FIG. 7 is a perspective view of the device in the position of changing a tablet.

FIGS. 6 and 7 show two positions of the lever 15.

In the case of FIG. 7, the position of the lever 15 is such that it causes a position of the cam 16 substantially corresponding to the operating phase of FIG. 1.

In this case, the movable portion 3 is inclined downwardly to provide an abutment surface 6 in its upper portion to coact with the external lower surface of the tablet 2.

The surface 6 thus constitutes an abutment in the supply phase of the tablet 2.

According to the position of the lever 15 shown in FIG. 6, the cam 16 has caused a rotation to reach the operating position shown in FIG. 2, and in which the infusion chamber 1 is closed in the extraction position.

The path of the lever 16 can be limited in rotation by means of an abutment 28 of current designed for example, in the form of a finger adapted to move in an oblong hole secured to the chassis of the device.

To ensure or to optimize the sealing of the infusion chamber 1 in the closed position, it is preferable to add to the closing pressure caused by the user by means of the lever 15, an additional pressure.

In this case, an additional means for holding closed the two portions 3, 4 of the infusion chamber 1 is constituted by a supplement, as will be described more precisely in what follows.

Preferably, the device also comprises guide means for the tablet 2 during its movement during operating phases.

In this case, guide means could be provided in the form of a slide way 25 constituted by two grooves 26 adapted to embrace the periphery of the tablet 2.

The periphery of said tablet 2 can be inserted into each of the grooves 26 thus constituted.

Guide means are preferably mounted in translation to follow the movement apart and together of the two portions.

In this sense, these means have a movement coupled to that of the translatory member 21 by means of pusher 31 shown particularly in FIG. 7.

The pusher 31 comprises a portion with a gap 32 adapted to constitute two bearing portions of the pusher 31 on a corresponding surface of the guide means.

In this way, the movement of the guide means follows that of the translatory member 21 in the course of the operating phases.

Moreover, the vacuum between the two bearing surfaces formed by the gap 32 ensures retardation in the movement of the guide means adapted to ensure first of all an advance of the movable portion 3 alone, and then a joint advance of the guide means and the movable portion 3 toward the fixed portion 4.

The pusher system thus constituted can be made in a guided manner about two lateral guides 30a, 30b ensuring the guidance and translation of the movable members and the coherence of the constituent pieces of the device.

The phases of operation of the present invention are more particularly shown in FIGS. 8 to 14.

Figure 8:
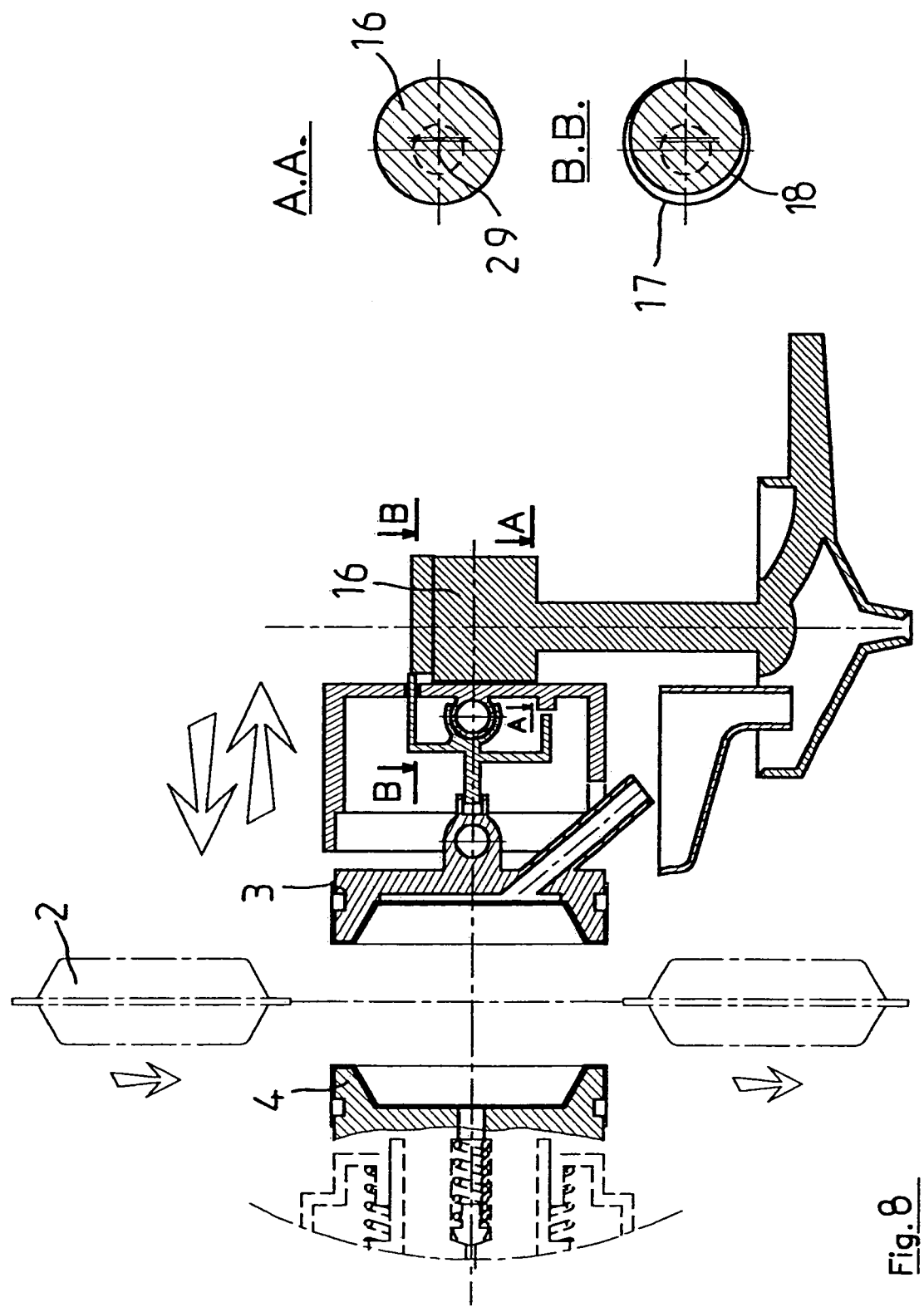
FIG. 8 shows schematically the phases of movement of the device according to the invention.

FIG. 8 schematically shows the different mobilities of the portion 3 and the infusion chamber 1.

In this case, the arrows schematically show the translation adapted to be carried out by the movable portion 3 under the influence of the cam 16.

Cross-sections A-A and B-B in FIG. 8 show moreover in a schematic manner the provision of the cam 16 and particularly the formation of two external bearing surfaces 17 and 18.

The surface 18 is adapted to receive the end of the pivoting arm 19.

With reference to FIGS. 9 to 12 and 9bis, 10bis, four successive steps of operation of the invention are shown.

Figure 9:
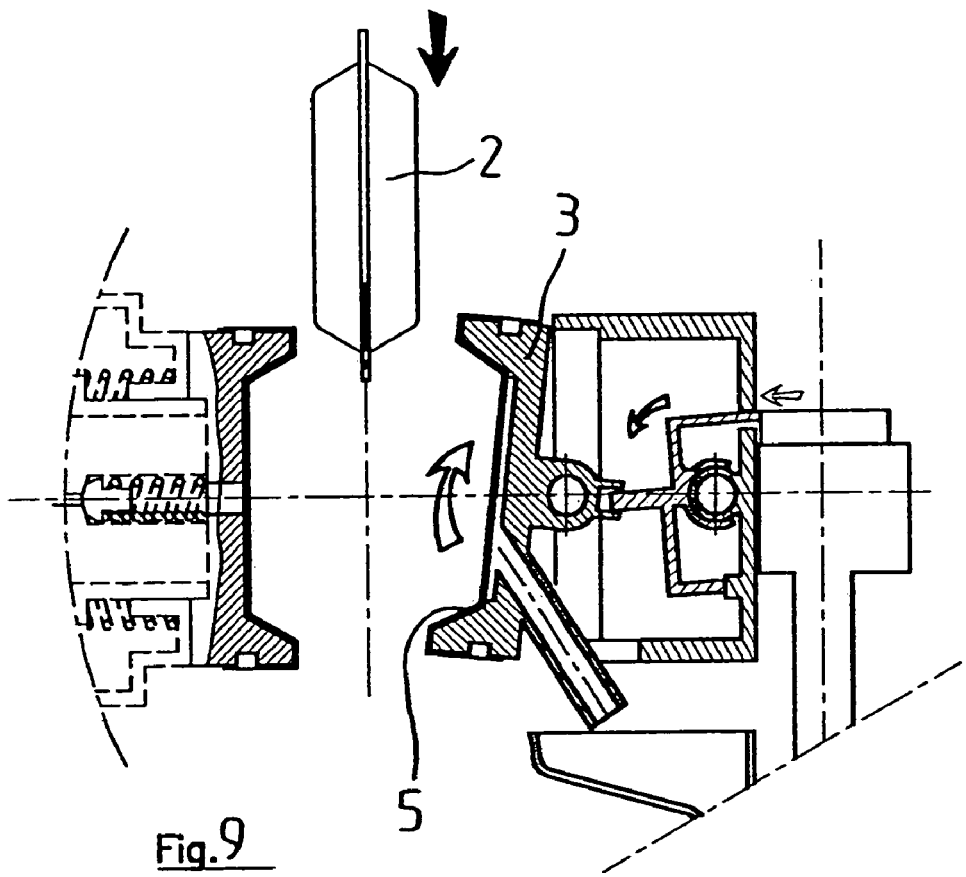

In FIG. 9, the cam 16 has been actuated to cause rotation of the movable portion 3, tending to open it to receive a tablet 2.

The upper portion of the movable portion 3 being out of the way, the feed abutment surface 6 formed until now at this point, is retracted and lets the tablet 2 fall by gravity.

The latter is then received by the movable portion 3 in its internal volume and it is applied against the surface 5 constituting a reception abutment.

Figure 10:
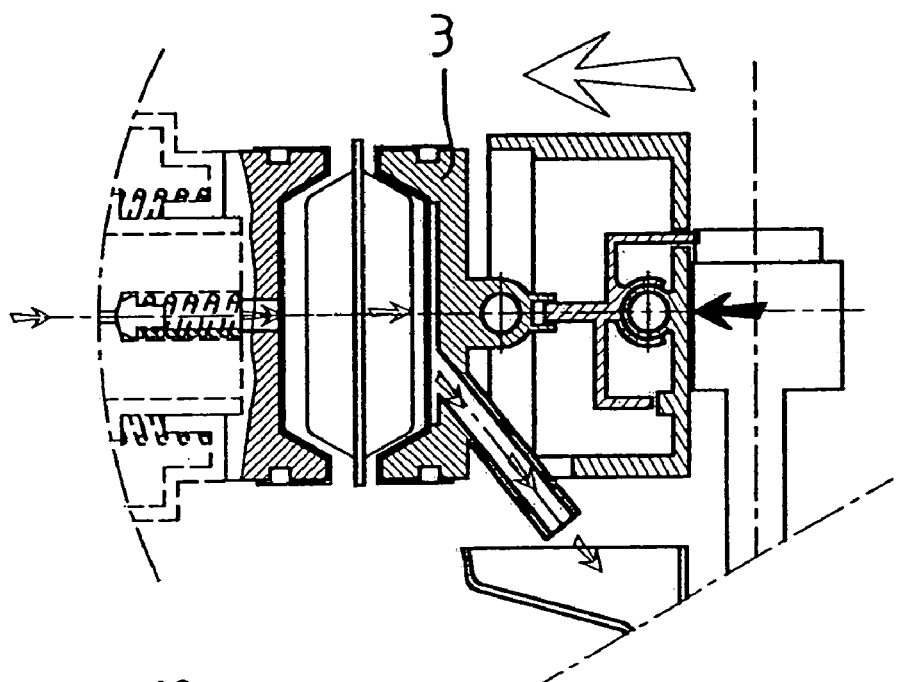
Figure 11:
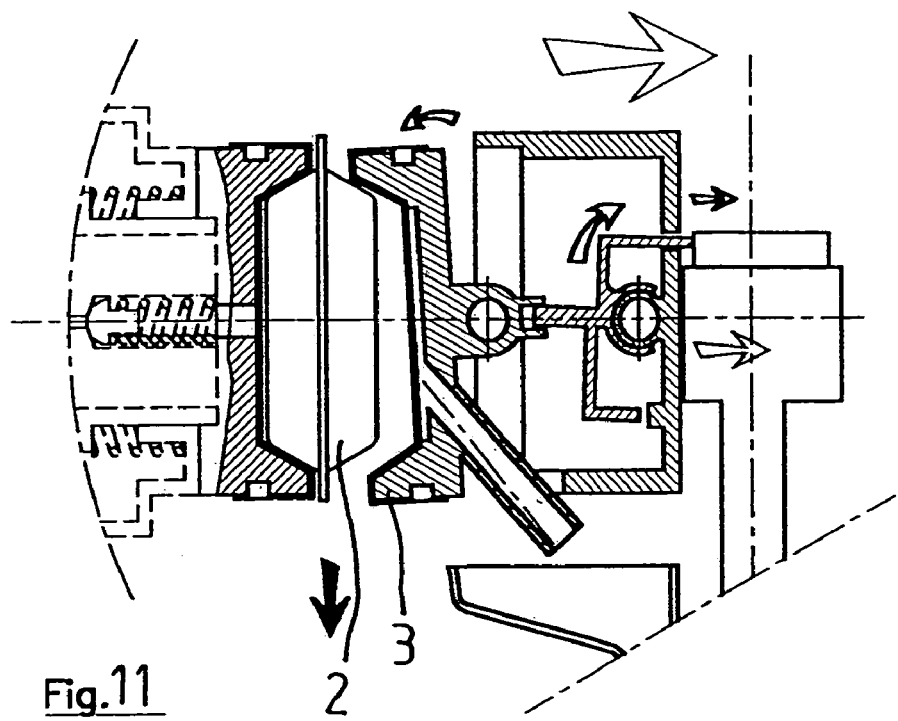
Figure 12:
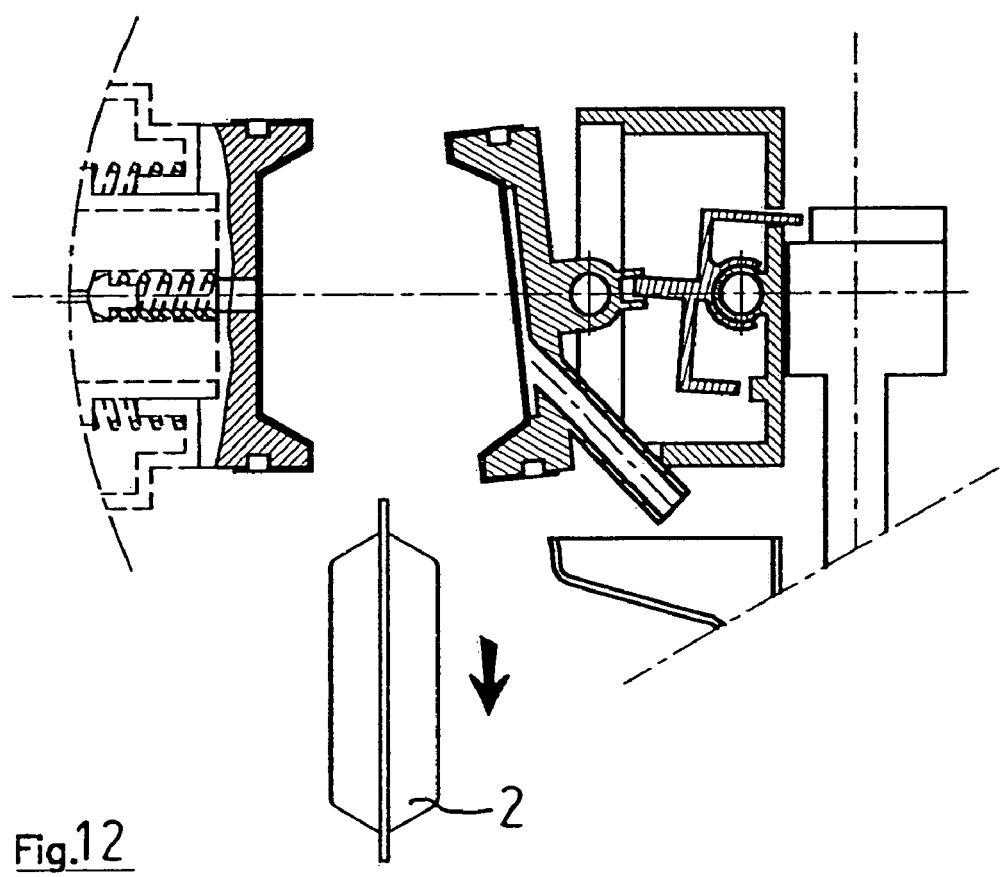

Further rotation of the cam 16 gives rise to translation of the movable portion 3 which is shown in FIG. 10.

However, the movable portion 3 also continues its rotation so as to reach a position substantially parallel to that of the fixed portion before the translatory movement places them into contact. This is shown in FIGS. 9bis and 10bis. In this way, the arrival of the movable portion 3 takes place in an optimum manner, over all the contact surface of the two portions 3, 4 in the closed position.

As soon as the infusion chamber is closed, the hot water is injected into the infusion chamber along the path of the hollow arrows shown in FIG. 10.

The beverage is recovered in the through and then in the funnel.

As soon as brewing is completed, a reverse movement of the cam 16 causes recoil of the movable portion 3 and its pivoting in the trigonometric direction.

The movable portion being out of the way, the tablet 2 can be freed and fall by gravity to a recovery zone.

The thus-pivoted position of the movable portion 3 downwardly ensures the formation again of the abutment surface 6 for supply in the upper portion of the movable portion 3.

Figure 13:
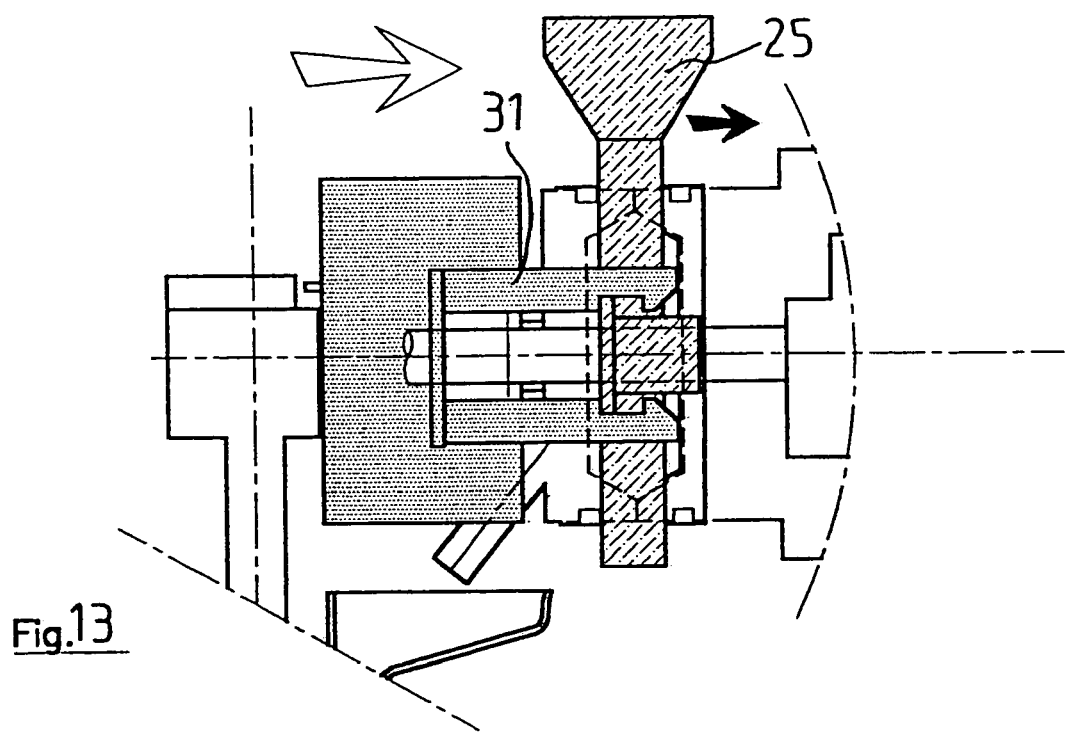
FIGS. 13 and 14 show in side view the translatory movement of the guide means.
Figure 14:
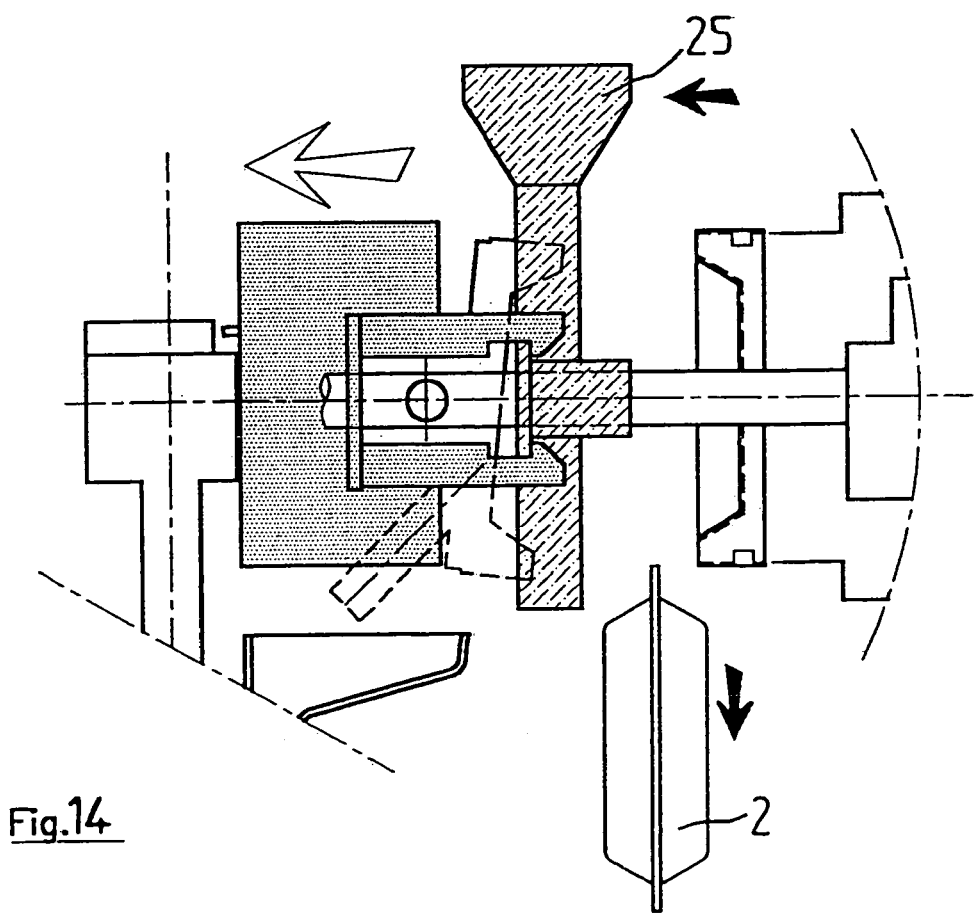
Figure 15:
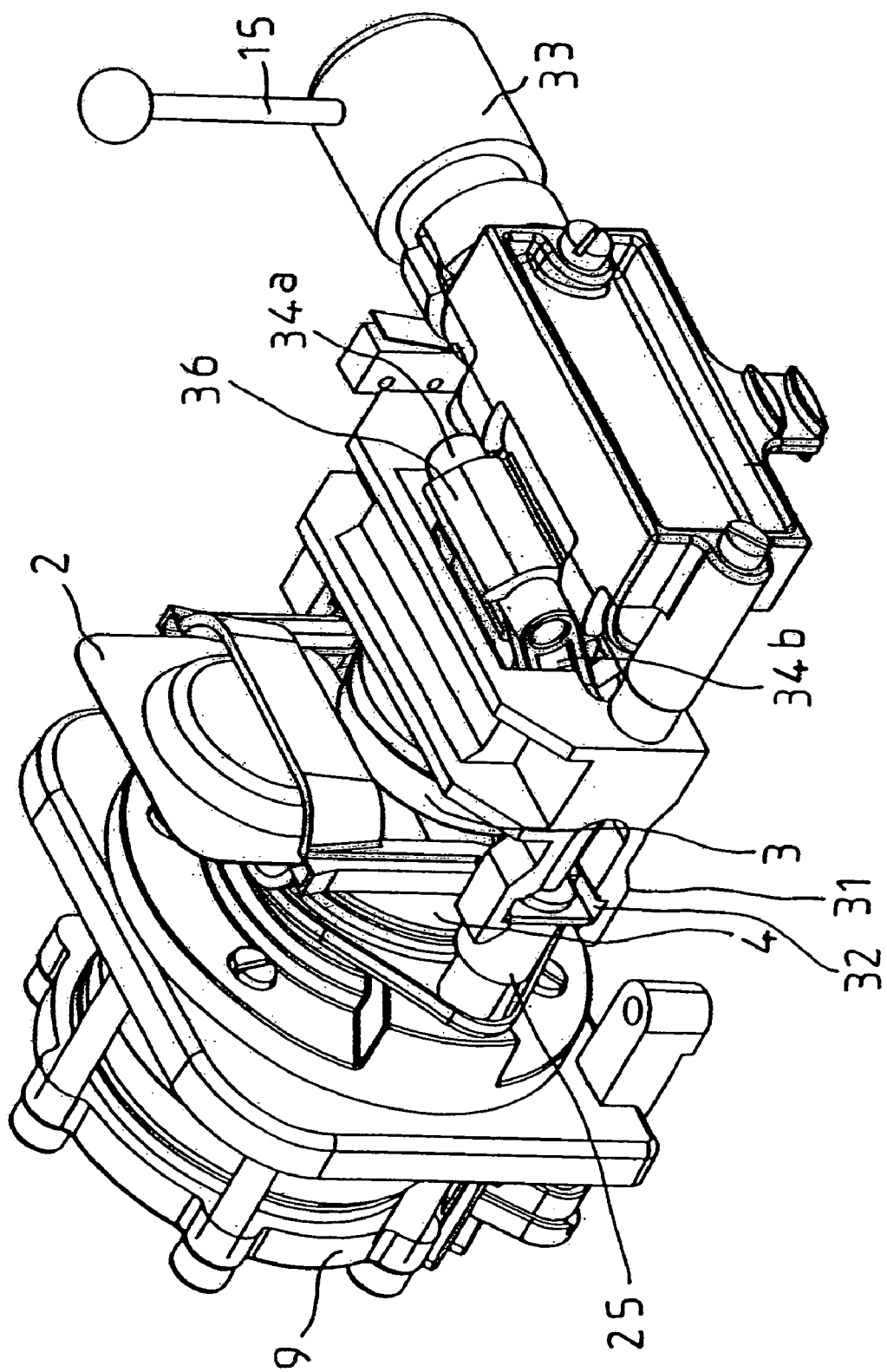
FIG. 15 is a general perspective view of the device of the invention.

FIGS. 13 and 14 show in a side view the provision of the translatory movement of the guide means when the latter are present.

In this case, there is seen the pusher 31 adapted to cause the advance of the guide means 25 to the extent of the advance of the movable portion 3.

The gap 32 present on the pusher 31 however ensures retardation in the translation of the guide means 25.

FIG. 14 shows the end of the discharge of the tablet 2 which takes place as soon as the movable portion 3 is retracted and while the guide means 25 are still in position.

Once the tablet is discharged, the guide means 25 undergo in turn a translation in the direction indicated by the hollow arrow.

The retraction taking place during translation of the guide means 25 ensures the good freeing of the tablet 2 before return to the complete initial position of the device.

Second Embodiment

Another actuation mode is presented here with reference to FIGS. 15 to 22.

Figure 18:
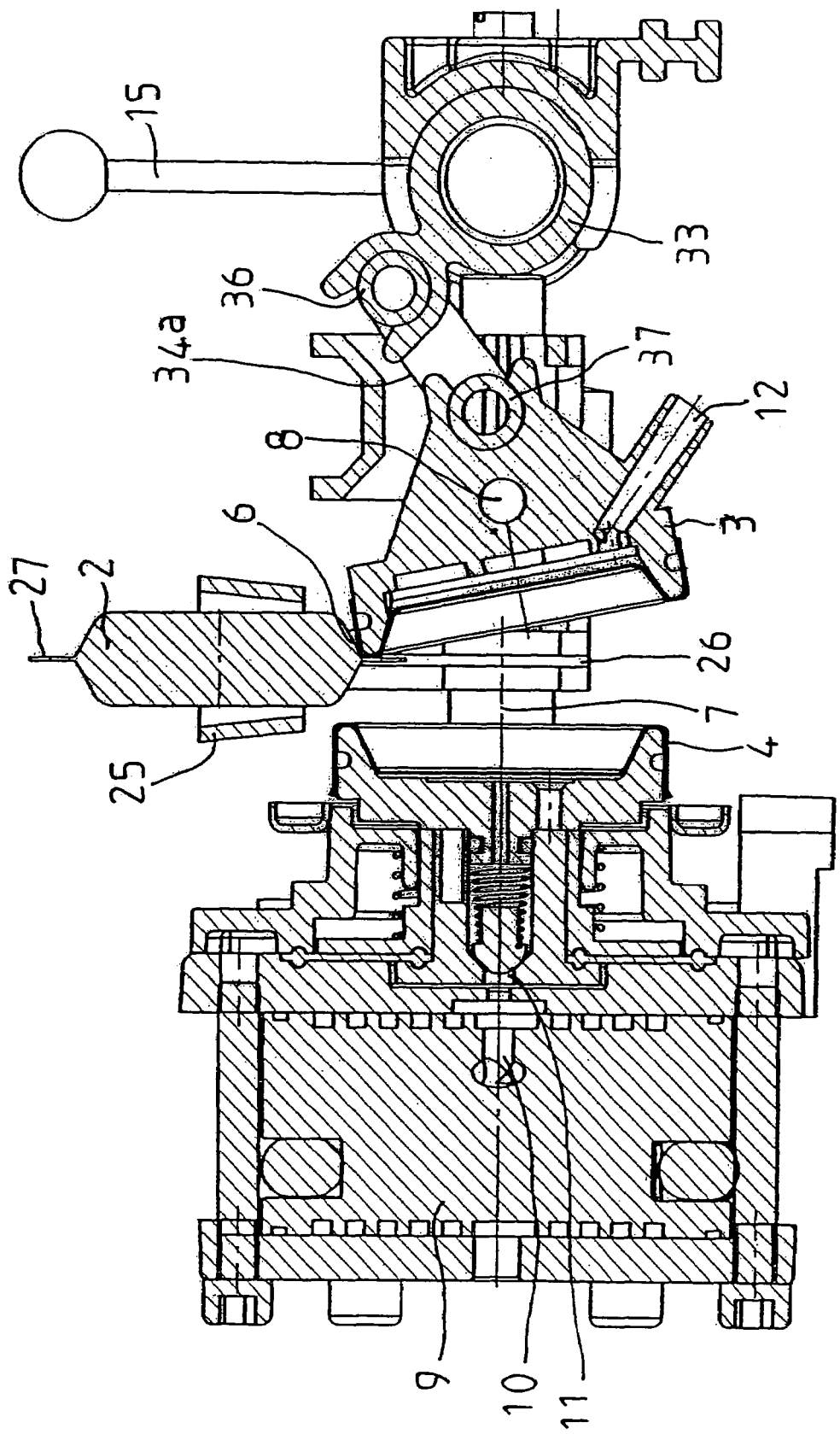

There is shown by way of example, in FIG. 18, the position of the axis 8 of rotation of the movable portion 3 and the axis 7 of its translation.

The single drive means is constituted by a drive shaft 33 with a horizontal axis of rotation and adapted to cause the movements of the movable portion 3.

To do this, the shaft 33 coacts with at least one rod 34*a*, 34*b* but preferably two rods.

As can be seen for example in FIG. 18, the rod 34*a*, 34*b* is mounted in pivotal connections 36, 37 on the one hand on shaft 33 and on the other hand on the rear end of the movable portion 3.

A translatory member 21 is also provided to follow the translatory movement of the movable portion 3 and to ensure the pivotal articulation about axis 8 of said movable portion 3.

Figure 16:
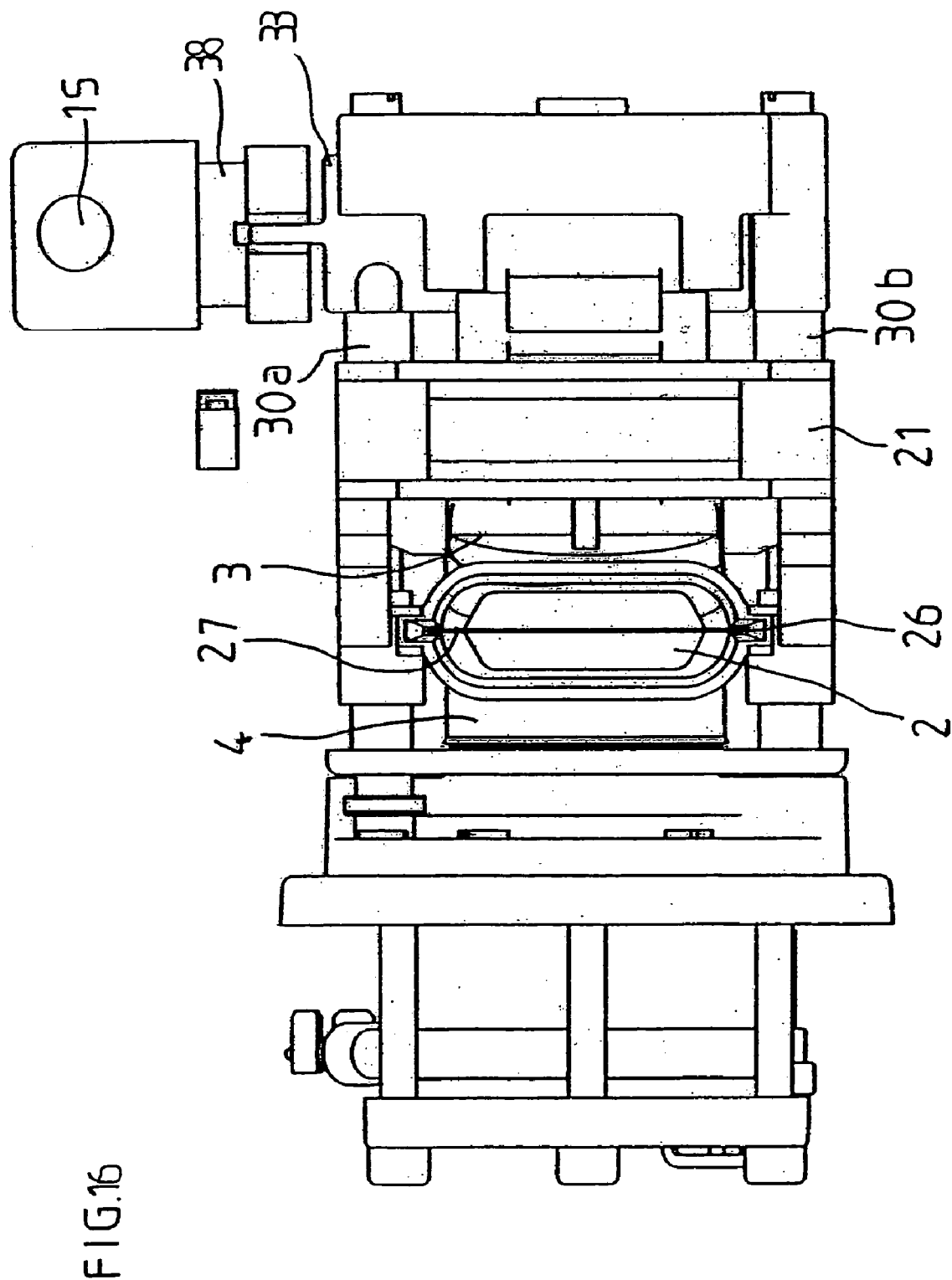
FIG. 16 is a top plan view.

The translation of the member 21 is moreover guided by guide means which could be constituted by two lateral guides 30*a*, 30*b* as is seen in FIG. 16.

According to a first possibility, the shaft 33 is driven in rotation by a motor.

According to a second possibility, shown in the drawings, the rotational drive is effected by the force of a lever 15 that can be actuated by the user.

In this case, the movable portion 3 is inclined downwardly to provide an abutment surface 6 in its upper position to coact with the lower external surface of the tablet 2.

The surface 6 thus constitutes an abutment in the supply phase of the tablet 2.

To optimize the sealing of the effusion chamber 1 in the closed position, it is preferably to add to the closing pressure provided by the user by means of the lever 15, an additional pressure.

In this case, an additional gripping means to close the two portions 3, 4 of the infusion chamber 1 is constituted supplementally as described later.

Preferably, the device also comprises guide means for the tablet 2 during its movement during the operating phases.

In this case, guide means can be provided in the form of a slide way 25 constituted by two grooves 26 adapted to encase the periphery of the tablet 2.

The periphery of said tablet 2 can be inserted in each of the grooves 26 thus provided.

Guide means are preferably mounted for translation to follow the movement toward and away from each other of the two portions.

Figure 17:
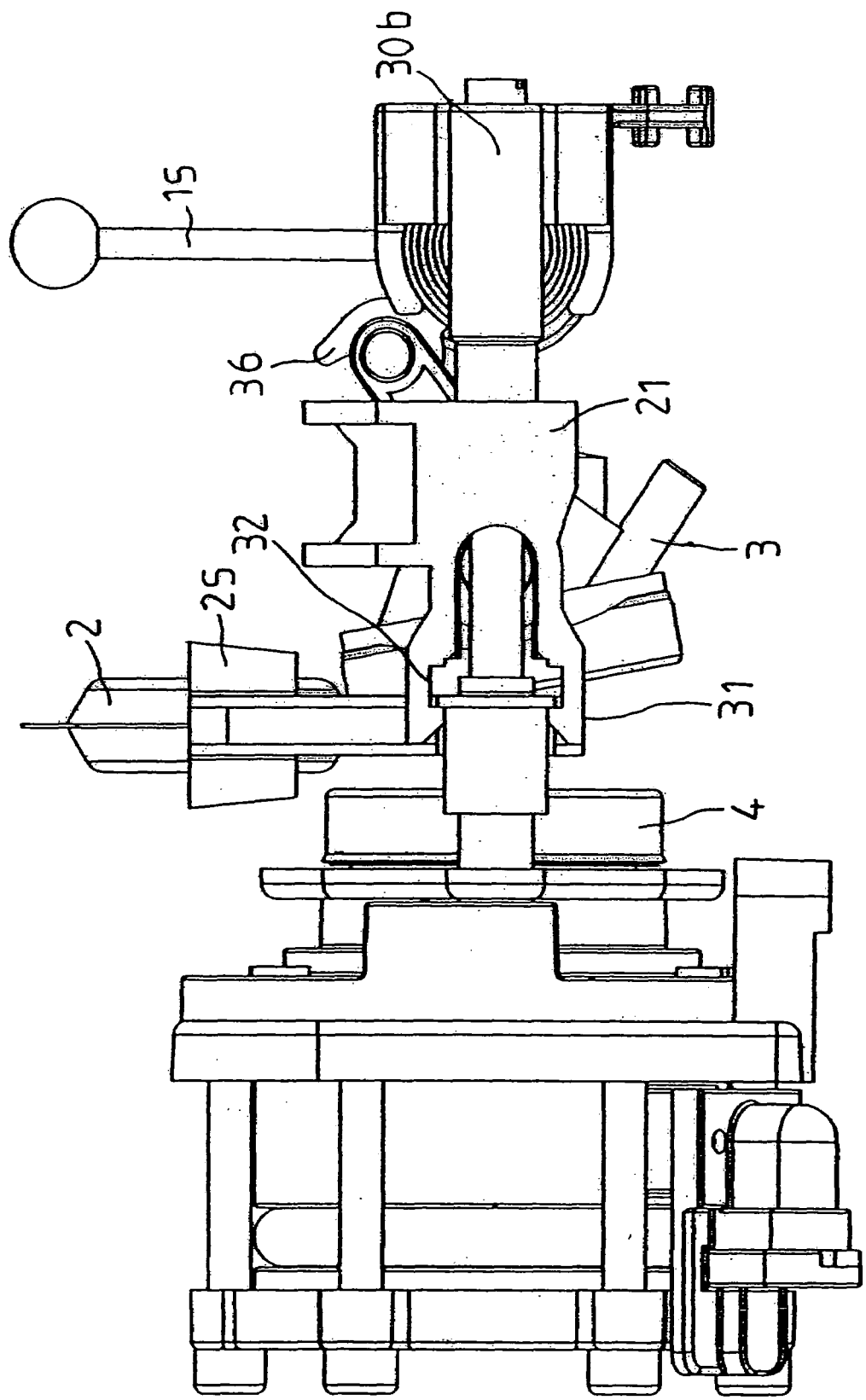
FIGS. 17 and 18 are respectively side and longitudinal cross-sectional views of the device of the invention in the position of supplying tablets.

In this sense, these means have a movement coupled with that of the translatory movement 21 by means of pushers 31 shown particularly in FIG. 17.

The pusher 31 comprises a recess portion 32 adapted to constitute two bearing portions of the pusher 31 on a corresponding surface of the guide means.

In this way, the movement of the guide means follows that of the translatory member 21 in the course of the operating phases.

Moreover, the vacuum constituted between the two bearing surfaces formed by the gap 32 ensures a retardation in the movement of the guide means adapted to ensure first of all an advance of the movable portion 3 alone, then a joint advance of the guide means and of the movable portion 3 toward the fixed portion 4.

The pusher system thus constituted can be provided in a guided fashion about two lateral guides 30*a*, 30*b* ensuring the guidance in translation of the movable members and the cohesion of the constituent members of the device.

The phases of operation of the present device are more particularly shown in FIGS. 17 to 22 and permit the carrying out of the steps of production of the beverage with the same modifications of configuration of the infusion chamber 1 as in the case of the first embodiment.

FIGS. 17 and 18 show a first operating position of the device in which the tablet 2 is in the abutment position on the upper wall of the movable portion 3.

The lever 15 it itself in a predetermined angular position, vertical in this case.

Figure 19:
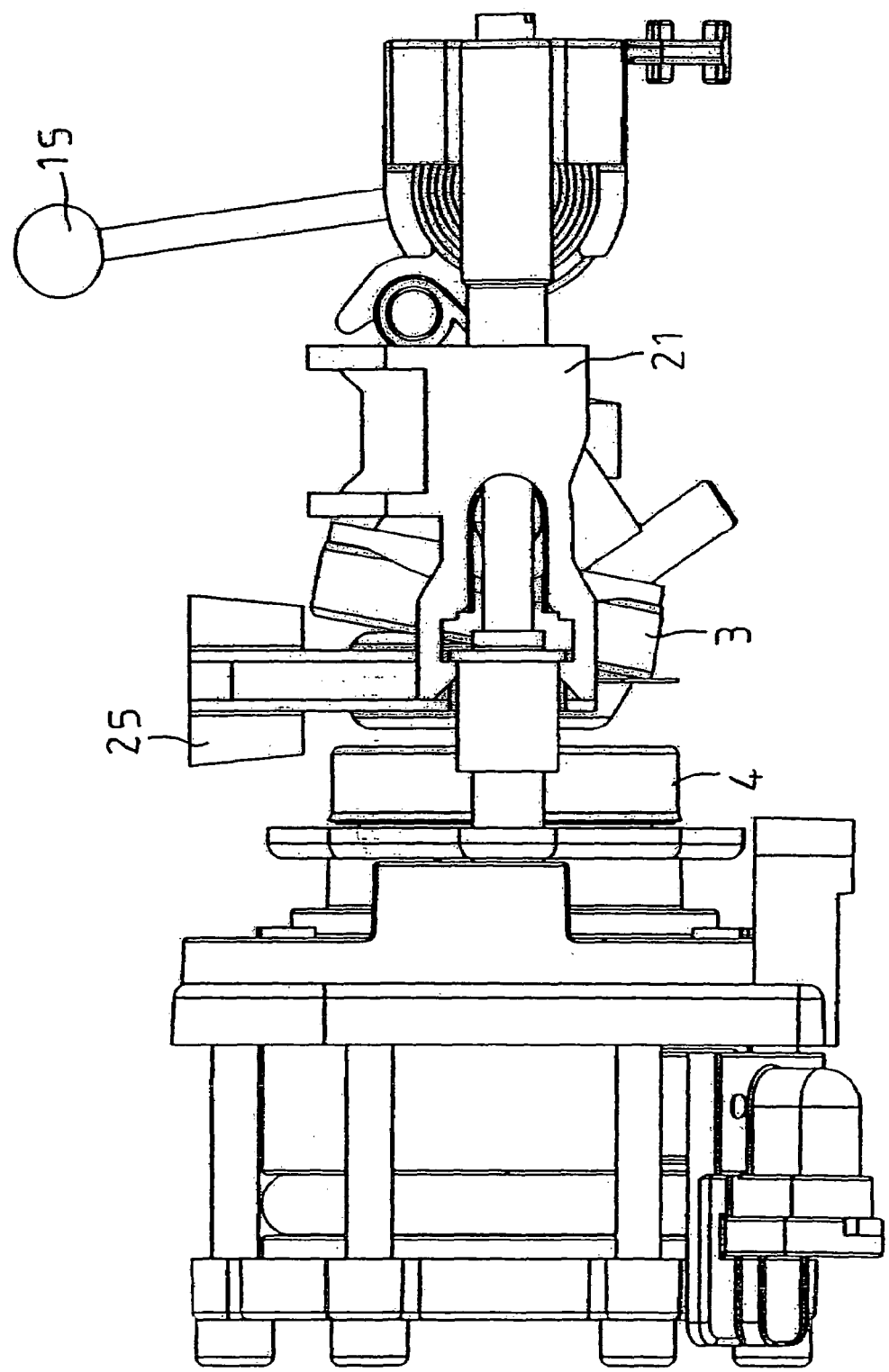
FIGS. 19 and 20 are respectively side and cross-sectional views of the device of the invention in a position of receiving tablets in the infusion chamber.
Figure 20:
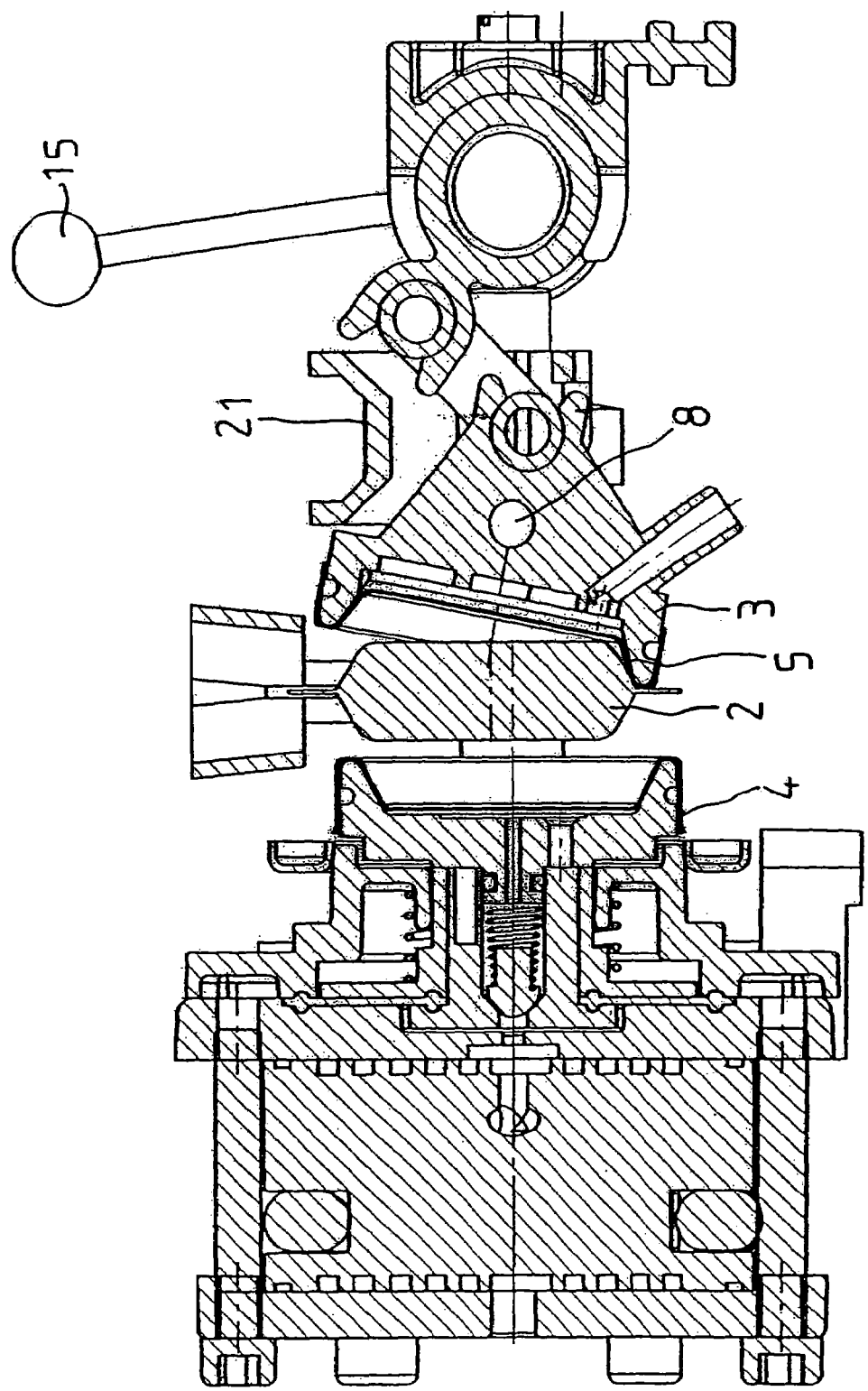

An actuation of the lever 15 in the trigonometric direction permits arriving at the position shown in FIGS. 19 and 20 in which the tablet 2 is received in the movable portion 3.

Between these two phases of movement, the drive shaft 33 has carried out a pressure of the rod 32*a* against the rear portion of the movable portion 3 and has particularly caused a rotation of the movable portion in the clockwise direction.

Continuing the rotation of the lever 15, the shaft 33 gives rise to a supplemental pressure on the movable portion 3 by means of rods 34*a*, 34*b*, this supplemental pressure tending to cause translation of the movable portion 3 and it closure to constitute the extraction chamber 1.

There can be provided abutment surfaces particularly on the translatory member 21 to limit the angular movement of the movable portion 3.

Figure 21:
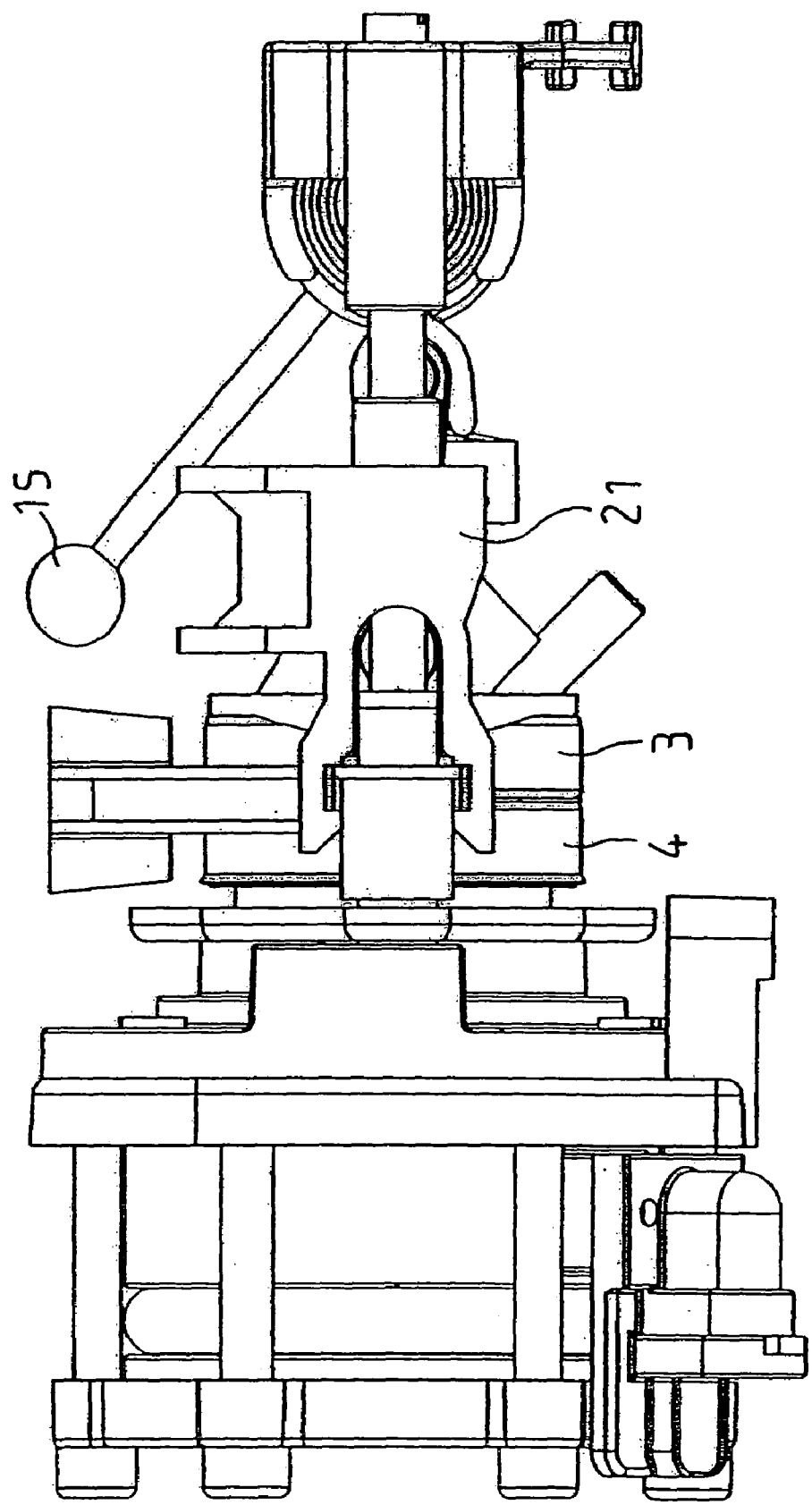
FIGS. 21 and 22 are respectively side and longitudinal cross-sectional views of the device of the invention in the extraction position.
Figure 22:
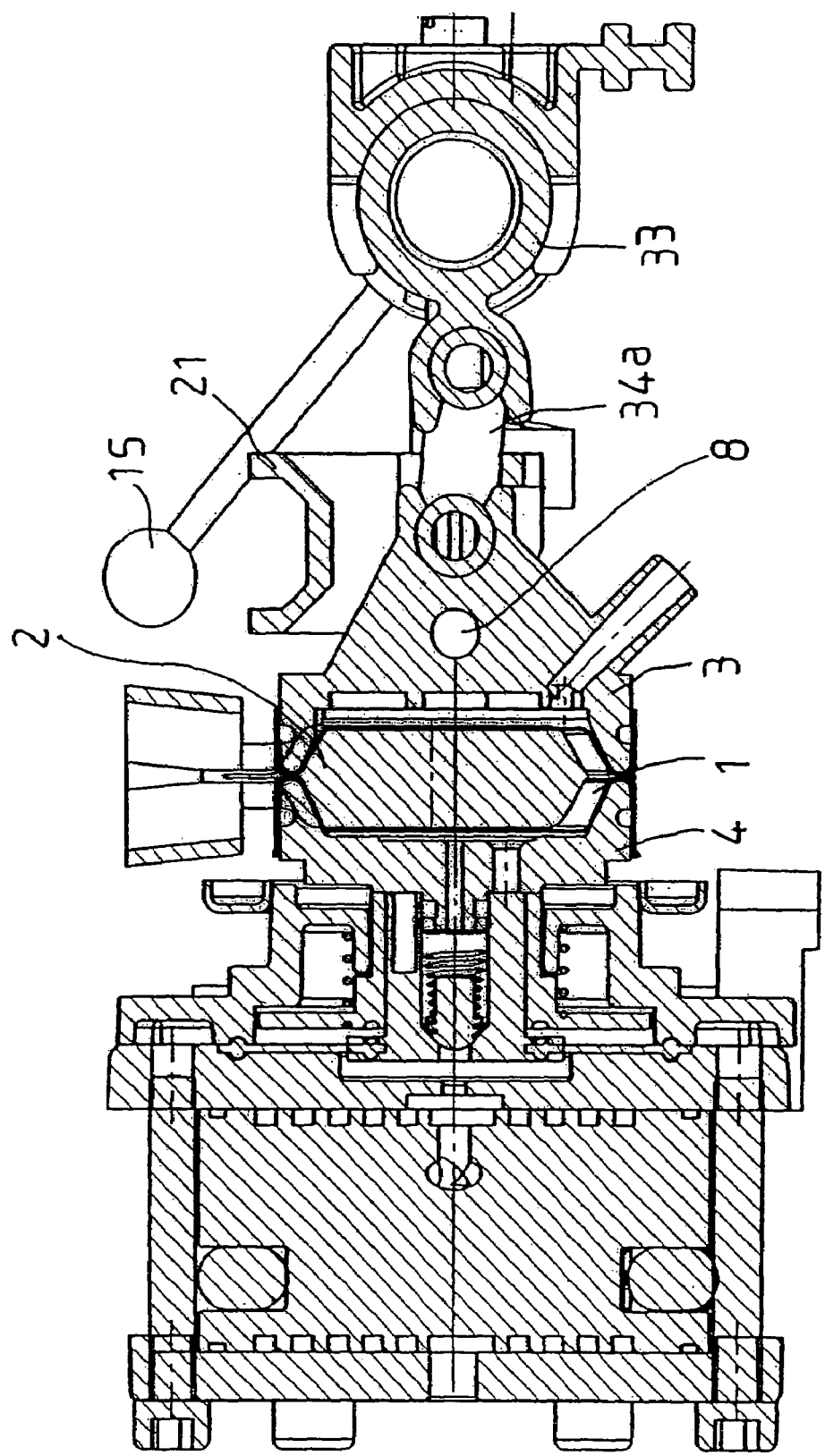

Thus, in the position shown in FIGS. 21 and 22, the movable portion 3 closes the extraction chamber 1.

When the infusion chamber is closed, hot water is injected into the infusion chamber.

The beverage is recovered in the trough 13.

When brewing is completed, a reverse movement of the shaft 33 causes retraction of the movable portion 3 and its pivoting in the trigonometric direction.

The movable portion being out of the way, the tablet 2 can be freed and fall by gravity toward a recovery zone.

The thus-pivoted portion of the movable portion 3 downwardly ensures the formation once more of the abutment surface 6 for supply in the upper portion of the movable portion 3.

FIGS. 17, 19 and 21 show in side view the provision of the translatory movement of the guide means when these latter are present.

To this end, the pusher 31 is shown, adapted to cause the advance of the guide means 25 with the advance of the movable portion 3.

The gap 32 present on the pusher 31 however ensures a retardation in the translation of the guide means 25.

The end of the evacuation of the tablet 2 takes place when the movable portion 3 is retracted and when the guide means 25 are still in position.

In the two embodiments thus provided, the actuation can take place manually by the action of a handle or a lever. The sealing is ensured or improved by additional gripping means. There is thus obtained a machine of lightweight design whilst maintaining its efficiency and in particular a good sealing.

There will now be described a preferred embodiment of the additional gripping means, more particularly with reference to FIGS. 23 and 24.

Figure 23:
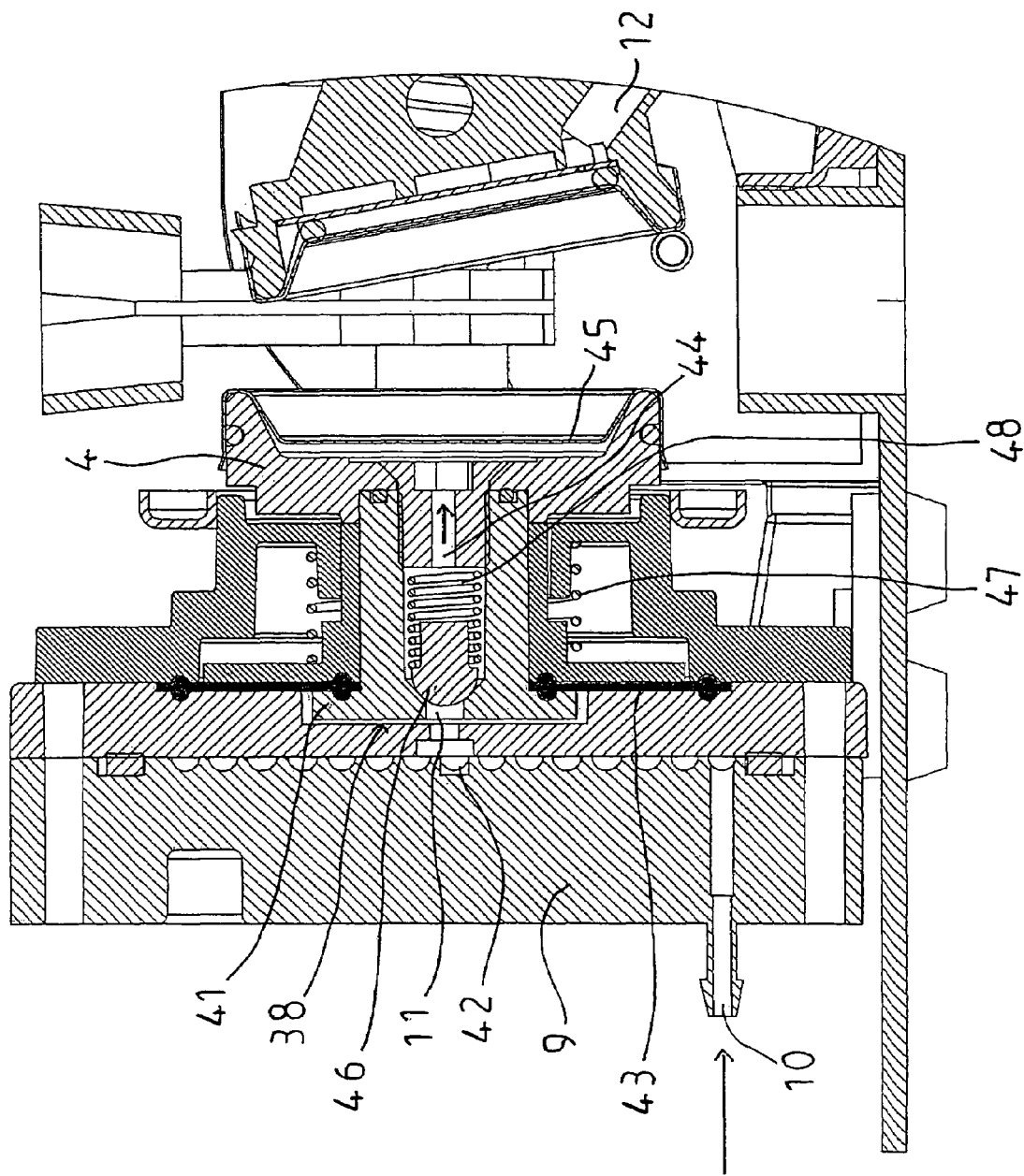
FIG. 23 shows in fragmentary cross-section the device with a preferred embodiment of the additional means for closing in the rest position.
Figure 24:
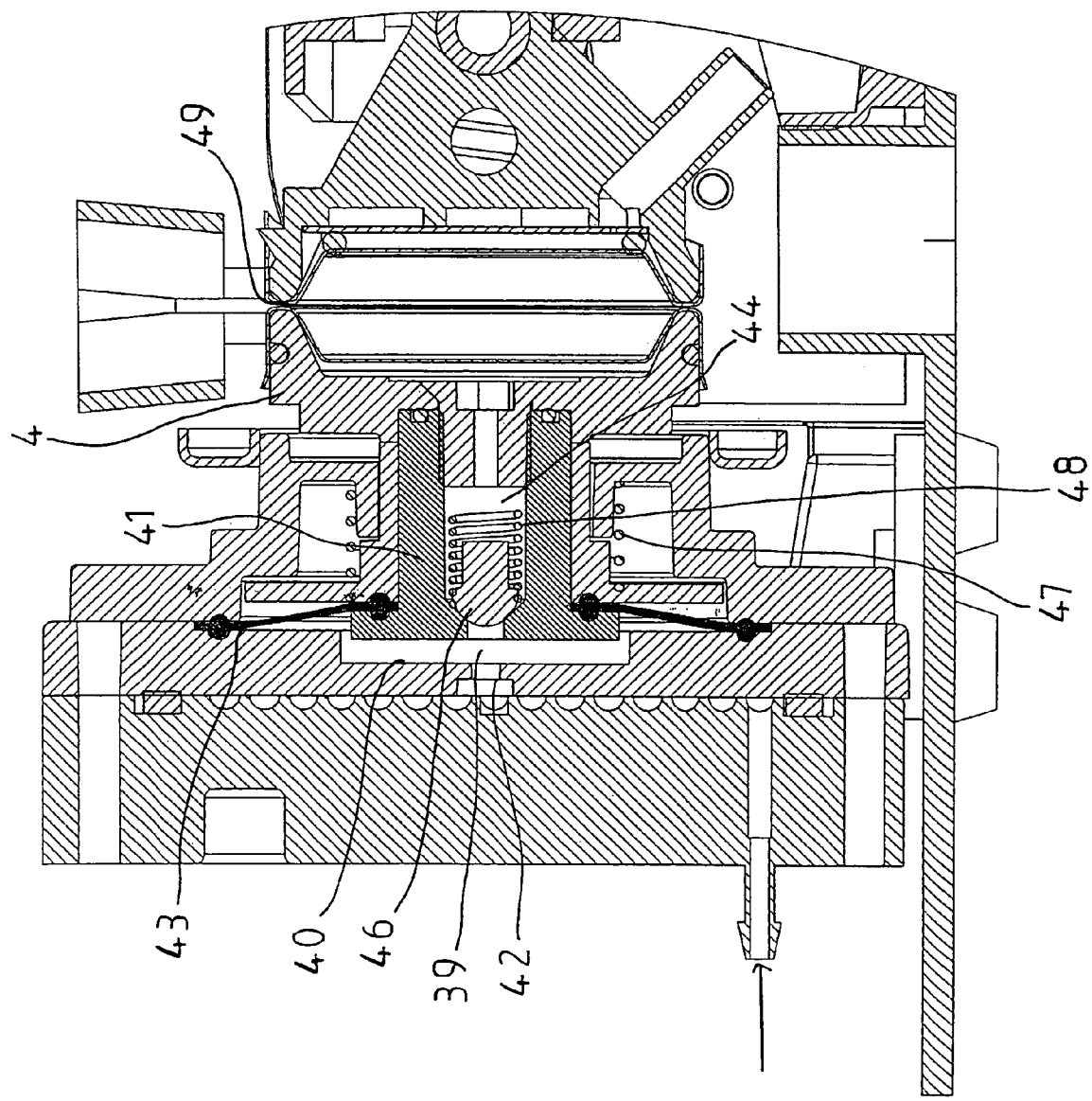
FIG. 24 shows an active closed position.

In the case shown in FIGS. 23 and 24, the additional gripping means ensure movement over a short translatory path, of the portion 4 fixed in rotation. In this way, when the movable portion 3 has reached the closure position of the infusion chamber 1, this movement of short path in translation permits ensuring or augmenting the relative pressure of the two portions 3, 4 at the region of the peripheral zone of the tablet 2. There is thus created a peripheral sealing zone 49 particularly shown in FIG. 24.

According to the illustrated embodiment, the translatory movement means are provided by a jack 38 in this case implanted conventionally in the device. Thus, the jack 38 is hydraulic and supplied by the same source as the infusion chamber 1, namely the heater 9. In this way, the additional gripping means do not require the provision of another hydraulic circuit.

As shown in FIGS. 23 and 24, the piston element of the jack 38 is provided by a movable member 41 secured to the portion 4 fixed in rotation so as to permits its advance or retreat according to the activation position of the jack 38. The fluid under pressure (in particular hot water from the heater 9) is adapted to be received in a chamber 39 to provide the pressure of the movable member 41. The chamber 39 is formed between the movable member 41 and a surface 40 of the heater 9, the surface 40 comprising preferably a slight depression permitting the formation of a sufficient volume for the chamber 39.

At the surface 40, the heater 9 comprises an outlet 42 permitting the arrival of hot water into the chamber 39.

To ensure the sealed closure of the chamber 39 of the jack 38, sealing means are present. They can be constituted by joints but preferably by the action of a resilient sealing member 43 against visible in FIGS. 23 and 24.

The elastic sealing member is formed by a substantially annular member connected securely and sealingly by its external periphery to the surface 40 of the heater and by its internal periphery to the movable member 41. The elastic sealing membrane 43 deforms according to the condition of actuation of the jack 38.

It will be easily understood that, when hot water is admitted into the chamber 39 from the heater 9, the volume of the chamber 39 tends to increase and a pressure is applied to the corresponding surface of the movable member 41. This pressure gives rise to movement of the movable member 41 and accordingly the advance of the portion fixed in rotation 4. This advanced condition is shown in FIG. 24. In this case, gripping is carried out.

In this condition, the hot water can be injected into the portion 4 so as to produce forced brewing in the infusion chamber 1. This injection takes place through a spray 48 of conventional design constituting an internal cladding of the portion 4.

The injection of hot water into the infusion chamber 1 is carried out by means of a supply passage 44 placing the chamber 39 of the jack 38 into communication with the spray 45. To avoid circulation of water toward the spray 45, both in the rest position of the gripping means and in the open position of the infusion chamber 1, the invention provides an advantageous supplemental characteristic.

Thus, as shown in FIGS. 23 and 24, the supply passage 44 comprises a valve 46 configured to open the supply passage 44 only beyond a pressure threshold of a value higher than the working pressure of the jack 38.

In this way, the addition of hot water into the chamber 39 from the outlet 42 of the heater 9 gives rise, in a first instance, to the actuation of the jack 38 and the advance of the portion 4 to produce additional gripping.

Then, when gripping is obtained, the pressure continues to increase in the volume 39 to reach a level ensuring the movement of the valve 46 to open the supply passage 44 and to produce the injection of hot water into the infusion chamber 1.

By way of example, it is possible to adjust the pressure threshold triggering the valve 46 to a level of the order of 2 bars. This adjustment can be carried out by the choice of the spring 48 ensuring return to the rest position (closed) of the valve 46.

When the injection of water into the infusion chamber 1 is over, the admission of hot water into the chamber 39 is stopped so as to produce the return to the rest position of the jack 38. This return can be carried out by means of the resilient properties of the membrane 43. Moreover, a return spring 47 is also provided for this purpose.

In this way, during manual actuation, the user need only carry out an actuation of a limited force to place in the closed position or open position the infusion chamber 1. When closure is carried out manually, the additional gripping means ensure a perfect sealing of the infusion chamber 1, at the peripheral sealing zone. Brewing can then take place, and this with pressures that can correspond perfectly to the pressures of machines of the espresso type and in particular of the order of 15 bars.

Without recourse to these additional gripping means, it would be forever difficult for the user to ensure manually the sufficiently tight closure of the infusion chamber 1 to operate at such pressure levels.

REFERENCES

1. Infusion chamber
2. Tablet
3. Movable portion
4. Fixed portion
5. Reception abutment
6. Supply abutment
7. Translatory axis
8. Rotational axis
9. Heater
10. Water circuit
11. Inlet
12. Outlet
13. Trough
14. Funnel
15. Lever
16. Cam
17. First surface
18. Second surface
19. Pivoting arm
20. Path limiter
21. Translatory member
22. Finger
23. Fork
25. Slide way
26. Groove
27. Periphery of tablet
28. Abutment
29. Cam axis
30a, 30b. Lateral guides
31. Pusher
32. Gap
33. Drive shaft
34a, 34b. Rod
35. Pivotal connection on the shaft
36. Pivotal connection on the movable portion 37. Coupling member
38. Jack
39. Jack chamber
40. Surface
41. Movable member
42. Outlet
43. Membrane
44. Supply passage
45. Spray
46. Valve
47. Return spring
48. Spring
49. Region of peripheral sealing

The invention claimed is:

1. A device for the production of beverages by infusion of a product contained in a tablet, comprising:
   an infusion chamber (1) adapted to receive a tablet (2) and comprising two portions (3, 4) that are movable toward or away from each other to close or open the infusion chamber, only one of the two portions being movable in rotation and adapted to come into abutment with the tablet in the other of the two portions, the one portion movable in rotation also being movable in translation to open or close the infusion chamber, the other of the two portions being fixed in rotation and movable in translation;
   a hydraulic jack connected to and moving in translation the other portion that is fixed in rotation to press closed the two portions of the infusion chamber (1); and
   a heater supplying a same fluid to both said infusion chamber and said hydraulic jack.

2. A device for the production of beverages by infusion of a product contained in a tablet, comprising:
   an infusion chamber (1) adapted to receive a tablet (2) and comprising two portions (3, 4) that move toward or away from each other to close or open the infusion chamber, only one of the two portions being movable in rotation and into abutment with the tablet in the other of the two portions, the one portion movable in rotation also being movable in translation to open or close the infusion chamber;
   a heater providing a fluid to said infusion chamber;
   a hydraulic jack (38) pressing closed the two portions of the infusion chamber (1) by moving in translation the other portion that is fixed in rotation, said jack being supplied by said heater (9); and
   said jack having a chamber (39) between a surface (40) of the heater (9) and a movable member (41) secured to the portion fixed in rotation (4) of the infusion chamber (1), the surface (40) comprising an outlet (42) for hot water from said heater.

3. Device according to claim 2, further comprising a resilient sealing member (43) between said surface (40) and said movable member (41) to close in a sealed manner the chamber (39) of the jack (38).

4. Device according to claim 2, wherein the movable member (41) comprises a supply passage (44) of the infusion chamber (1) formed between the chamber (34) of the jack (38) and a spray (45) present on the portion fixed in rotation (4), and the supply passage (44) has a valve (46) adapted to open the supply passage (44) at a pressure higher than the working pressure of the jack (38).

5. Device according to claim 2, further comprising a return spring (47) for the movable member (41) of the jack (38).

* * * * *